(12) United States Patent
Seki

(10) Patent No.: US 8,838,329 B2
(45) Date of Patent: Sep. 16, 2014

(54) HYDRAULIC SHOVEL CALIBRATION SYSTEM AND HYDRAULIC SHOVEL CALIBRATION METHOD

(75) Inventor: Masanobu Seki, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/819,473

(22) PCT Filed: Mar. 16, 2012

(86) PCT No.: PCT/JP2012/056823
§ 371 (c)(1),
(2), (4) Date: Feb. 27, 2013

(87) PCT Pub. No.: WO2012/128200
PCT Pub. Date: Sep. 27, 2012

(65) Prior Publication Data
US 2013/0158788 A1    Jun. 20, 2013

(30) Foreign Application Priority Data

Mar. 24, 2011    (JP) ............................. JP2011-065977

(51) Int. Cl.
| | | |
|---|---|---|
| *G01M 17/00* | (2006.01) | |
| *G06F 7/00* | (2006.01) | |
| *G06F 19/00* | (2011.01) | |
| *G06F 7/70* | (2006.01) | |
| *G06G 7/00* | (2006.01) | |
| *G06G 7/76* | (2006.01) | |
| *E02F 9/26* | (2006.01) | |
| *G01C 15/00* | (2006.01) | |

(52) U.S. Cl.
CPC ................ *E02F 9/261* (2013.01); *E02F 9/264* (2013.01); *G01C 15/00* (2013.01)
USPC .......................................... 701/33.1; 701/50

(58) Field of Classification Search
CPC ............................... F15B 19/002; E02F 9/262
USPC ..................................... 701/33.1, 50
See application file for complete search history.

(56) References Cited

U.S. PATENT DOCUMENTS

| | | | |
|---|---|---|---|
| 2004/0124605 A1* | 7/2004 | McClure et al. ............ 280/456.1 |
| 2010/0023222 A1* | 1/2010 | Chiocco ........................ 701/44 |
| 2010/0023229 A1* | 1/2010 | Chiocco ........................ 701/50 |

FOREIGN PATENT DOCUMENTS

| | | |
|---|---|---|
| JP | 7-150596 A | 6/1995 |
| JP | 11-140913 A | 5/1999 |
| JP | 2002-181538 A | 6/2002 |

OTHER PUBLICATIONS

International Search Report for PCT/JP2012/056823.

*Primary Examiner* — Imran Mustafa
(74) *Attorney, Agent, or Firm* — Global IP Counselors, LLP

(57) ABSTRACT

A current position computation unit of a hydraulic shovel computes a current position of a working point included in a work tool based on a plurality of parameters that indicate the dimensions and swing angles of a boom, an arm, and the work tool. A vehicle body coordinate system computation unit of a calibration device computes coordinate conversion information based on first and second working point position information measured by an external measurement device. A coordinate conversion unit converts coordinates at a plurality of positions of the working point measured by the external measurement device in a coordinate system of the external measurement device to those in a vehicle body coordinate system using the coordinate conversion information. A calibration computation unit computes calibration values of the parameters based on the converted coordinates at the plurality of positions of the working point in the vehicle body coordinate system.

6 Claims, 19 Drawing Sheets

| | No. | ITEM | REFERENCE NUMERAL |
|---|---|---|---|
| WORK MACHINE PARAMETERS | 1 | LENGTH BETWEEN BOOM PIN AND ARM PIN | L1 |
| | 2 | LENGTH BETWEEN ARM PIN AND BUCKET PIN | L2 |
| | 3 | LENGTH BETWEEN BUCKET PIN AND CUTTING EDGE OF BUCKET | L3 |
| | 4 | DISTANCE BETWEEN BOOM CYLINDER TOP PIN AND BOOM PIN | Lboom1 |
| | 5 | DISTANCE BETWEEN BOOM CYLINDER TOP PIN AND BOOM PIN IN xboom AXIAL DIRECTION | Lboom1_x |
| | 6 | DISTANCE BETWEEN BOOM CYLINDER TOP PIN AND BOOM PIN IN zboom AXIAL DIRECTION | Lboom1_z |
| | 7 | DISTANCE BETWEEN BOOM CYLINDER FOOT PIN AND BOOM PIN | Lboom2 |
| | 8 | DISTANCE BETWEEN BOOM CYLINDER FOOT PIN AND BOOM PIN IN VEHICLE BODY HORIZONTAL DIRECTION | Lboom2_x |
| | 9 | DISTANCE BETWEEN BOOM CYLINDER FOOT PIN AND BOOM PIN IN VEHICLE BODY VERTICAL DIRECTION | Lboom2_z |
| | 10 | DISTANCE BETWEEN ARM CYLINDER FOOT PIN AND ARM PIN | Lboom3 |
| | 11 | DISTANCE BETWEEN ARM CYLINDER FOOT PIN AND ARM PIN IN xboom AXIAL DIRECTION | Lboom3_x |
| | 12 | DISTANCE BETWEEN ARM CYLINDER FOOT PIN AND ARM PIN IN zboom AXIAL DIRECTION | Lboom3_z |
| | 13 | DISTANCE BETWEEN ARM PIN AND BUCKET PIN IN xarm2 AXIAL DIRECTION | Larm1_x |
| | 14 | DISTANCE BETWEEN ARM PIN AND BUCKET PIN IN zarm2 AXIAL DIRECTION | Larm1_z |
| | 15 | DISTANCE BETWEEN ARM CYLINDER TOP PIN AND ARM PIN | Larm2 |
| | 16 | DISTANCE BETWEEN ARM CYLINDER TOP PIN AND ARM PIN IN xarm2 AXIAL DIRECTION | Larm2_x |
| | 17 | DISTANCE BETWEEN ARM CYLINDER TOP PIN AND ARM PIN IN zarm2 AXIAL DIRECTION | Larm2_z |
| | 18 | DISTANCE BETWEEN BUCKET CYLINDER FOOT PIN AND FIRST LINK PIN | Larm3 |
| | 19 | DISTANCE BETWEEN BUCKET CYLINDER FOOT PIN AND FIRST LINK PIN IN xarm2 AXIAL DIRECTION | Larm3_x1 |
| | 20 | DISTANCE BETWEEN BUCKET CYLINDER FOOT PIN AND FIRST LINK PIN IN zarm2 AXIAL DIRECTION | Larm3_z1 |

FIG. 6A

| | No. | ITEM | REFERENCE NUMERAL |
|---|---|---|---|
| WORK MACHINE PARAMETERS | 21 | DISTANCE BETWEEN FIRST LINK PIN AND BUCKET PIN IN xarm2 AXIAL DIRECTION | Larm3_x2 |
| | 22 | DISTANCE BETWEEN FIRST LINK PIN AND BUCKET PIN IN zarm2 AXIAL DIRECTION | Larm3_z2 |
| | 23 | DISTANCE BETWEEN FIRST LINK PIN AND BUCKET PIN | Larm4 |
| | 24 | DISTANCE BETWEEN BUCKET CYLINDER TOP PIN AND FIRST LINK PIN | Lbucket1 |
| | 25 | DISTANCE BETWEEN BUCKET CYLINDER TOP PIN AND SECOND LINK PIN | Lbucket2 |
| | 26 | DISTANCE BETWEEN BUCKET PIN AND SECOND LINK PIN | Lbucket3 |
| | 27 | BOOM CYLINDER OFFSET | boft |
| | 28 | ARM CYLINDER OFFSET | aoft |
| | 29 | BUCKET CYLINDER OFFSET | bkoft |
| | 30 | DISTANCE BETWEEN BUCKET PIN AND SECOND LINK PIN IN xbucket AXIAL DIRECTION | Lbucket4_x |
| | 31 | DISTANCE BETWEEN BUCKET PIN AND SECOND LINK PIN IN zbucket AXIAL DIRECTION | Lbucket4_z |
| ANTENNA PARAMETERS | 32 | DISTANCE BETWEEN BOOM PIN AND REFERENCE ANTENNA IN x AXIAL DIRECTION IN VEHICLE BODY COORDINATE SYSTEM | Lbbx |
| | 33 | DISTANCE BETWEEN BOOM PIN AND REFERENCE ANTENNA IN y AXIAL DIRECTION IN VEHICLE BODY COORDINATE SYSTEM | Lbby |
| | 34 | DISTANCE BETWEEN BOOM PIN AND REFERENCE ANTENNA IN z AXIAL DIRECTION IN VEHICLE BODY COORDINATE SYSTEM | Lbbz |
| | 35 | DISTANCE BETWEEN BOOM PIN AND DIRECTION ANTENNA IN x AXIAL DIRECTION IN VEHICLE BODY COORDINATE SYSTEM | Lbdx |
| | 36 | DISTANCE BETWEEN BOOM PIN AND DIRECTION ANTENNA IN y AXIAL DIRECTION IN VEHICLE BODY COORDINATE SYSTEM | Lbdy |
| | 37 | DISTANCE BETWEEN BOOM PIN AND DIRECTION ANTENNA IN z AXIAL DIRECTION IN VEHICLE BODY COORDINATE SYSTEM | Lbdz |

FIG. 6B

| POSITION No. | CYLINDER STROKE (%) | | |
|---|---|---|---|
| | BOOM CYLINDER | ARM CYLINDER | BUCKET CYLINDER |
| 1 | 50 | 0 | 90 |
| 2 | 50 | 100 | 10 |
| 3 | 70 | 0 | 100 |
| 4 | 100 | 80 | 80 |
| 5 | 80 | 60 | 80 |

US 8,838,329 B2

HYDRAULIC SHOVEL CALIBRATION SYSTEM AND HYDRAULIC SHOVEL CALIBRATION METHOD

CROSS-REFERENCE TO RELATED APPLICATIONS

This application claims priority to Japanese Patent Application No. 2011-065977 filed on Mar. 24, 2011, the disclosure of which is hereby incorporated herein by reference in its entirety.

TECHNICAL FIELD

The present invention relates to a hydraulic shovel calibration system and a hydraulic shovel calibration method.

BACKGROUND ART

From the past, there is known a hydraulic shovel provided with a position detection device which detects the current position of a working point of a work implement. For example, in the hydraulic shovel disclosed in Japanese Laid-open Patent Application Publication No. 2002-181538, position coordinates of a cutting edge of a bucket are computed based on position information from a GPS antenna. Specifically, position coordinates of the cutting edge of the bucket are computed based on parameters such as a positional relationship of the GPS antenna and a boom pin, lengths of each of a boom, an arm, and the bucket, and each of the direction angles of the boom, the arm, and the bucket.

SUMMARY

Accuracy of the position coordinates of the cutting edge of the bucket which have been computed is affected by the accuracy of the parameters described above. However, these parameters normally have errors with regard to design values. As a result, the parameters are measured using a measurement means such as a measuring tape during initial settings of the position detection device of the hydraulic shovel. However, it is not easy to accurately measure the parameters as described above using a measurement means such as a measuring tape. In addition, in a case where there are a high number of parameters, a considerable amount of time is necessary in order to measure all of these parameters and this is burdensome.

In addition, the accuracy of position detection using the position detection device is confirmed after the parameters that have been measured are input into the position detection device. For example, the position coordinates of the cutting edge of the bucket are directly measured using GPS. Then, the position coordinates of the cutting edge of the bucket which have been computed using the position detection device are compared to the position coordinates of the cutting edge of the bucket which are directly measured by a GPS measurement device. In a case where the positional coordinates of the cutting edge of the bucket which have been computed using the position detection device and the positional coordinates of the cutting edge of the bucket which are directly measured by the GPS measurement device do not match, determining of the parameters using a measuring tape and inputting the parameters to the position detection device are repeated until the position coordinates match. That is, the values of the parameters are rearranged until the actual value and the computed value of the position coordinates match. An extremely long amount of time is necessary for such calibration work and this is burdensome.

An object of the present invention is to provide a calibration system and a calibration method for a hydraulic shovel which can improve the accuracy of position detection of a working point and shorten calibration work time.

A hydraulic shovel calibration system according to a first aspect of the present invention is provided with a hydraulic shovel, a calibration device, and an external measurement device. The hydraulic shovel includes a travel unit, a pivoting body, a work implement, an angle detection unit, and a current position computation unit. The pivoting body is rotatably attached to the travel unit. A boom is swingably attached to the pivoting body. An arm is swingably attached to the boom. A work tool is swingably attached to the arm. The angle detection unit detects a swing angle of the boom with respect to the pivoting body, a swing angle of the arm with respect to the boom, and a swing angle of the work tool with respect to the arm. The current position computation unit computes the current position of a working point included in the work tool based on a plurality of parameters that indicate the dimensions and the swing angles of the boom, the arm, and the work tool. The calibration device is a device for calibrating the parameters. The external measurement device is a device that measures the position of the working point. In addition, the calibration device includes an input unit, a vehicle body coordinate system computation unit, a coordinate conversion unit, and a calibration computation unit. The input unit is a unit where first working point position information and second working point position information are input. The first working point position information either includes at least two positions of the working point where the posture of the work implement is different and a position of a predetermined reference point on an action plane of the work implement, at least the two positions and the position of the predetermined reference point being measured by the external measurement device, or includes at least three positions of the working point where the posture of the work implement is different, at least the three positions being measured by the external measurement device. The second working point position information includes at least three positions of the working point where the rotation angle of the pivoting body with respect to the travel unit is different. The vehicle body coordinate system computation unit computes a first unit normal vector perpendicular to the action plane of the work implement based on the first working point position information. The vehicle body coordinate system computation unit computes a second unit normal vector perpendicular to a rotation plane of the pivoting body based on the second working point position information. The vehicle body coordinate system computation unit computes a third unit normal vector perpendicular to the first unit normal vector and the second unit normal vector. The coordinate conversion unit converts coordinates at a plurality of positions of the working point measured by the external measurement device in the coordinate system of the external measurement device to those in the vehicle body coordinate system of the hydraulic shovel using the first unit normal vector, the second unit normal vector, and the third unit normal vector. The calibration computation unit computes calibration values of the parameters based on the converted coordinates at the plurality of positions of the working point in the vehicle body coordinate system.

A hydraulic shovel calibration system according to a second aspect of the present invention is the hydraulic shovel calibration system according to the first aspect wherein the vehicle body coordinate system computation unit computes an intersection vector of the action plane of the work implement and a rotation plane of the pivoting body. The vehicle body coordinate system computation unit computes, as the second unit normal vector, a unit normal vector of a plane which passes through the intersection vector of the action plane of the work implement and the rotation plane and which is perpendicular to the action plane of the work implement.

A hydraulic shovel calibration system according to a third aspect of the present invention is the hydraulic shovel calibration system according to the first aspect wherein the first working point position information includes coordinates of a plurality of positions which are different positions in the upward and downward direction of the work implement and/or which are different positions in the front and back direction of the vehicle body.

A hydraulic shovel calibration system according to a fourth aspect of the present invention is the hydraulic shovel calibration system according to the first aspect wherein the parameters include a first distance, a second distance, and a third distance. The first distance is a distance between a swing pivot of the boom with respect to the pivoting body and a swing pivot of the arm with respect to the boom. The second distance is a distance between the swing pivot of the arm with respect to the boom and a swing pivot of the work tool with respect to the arm. The third distance is a distance between the swing pivot of the work tool with respect to the arm and the working point. The current position computation unit computes the current position of the working point in the vehicle body coordinate system based on the first distance, the second distance, the third distance, and the swing angles. The calibration computation unit computes the calibration values of the first distance, the second distance, and the third distance based on coordinates at a plurality of positions of the working point which are measured by the external measurement device and converted into the vehicle body coordinate system.

A hydraulic shovel calibration system according to a fifth aspect of the present invention is the hydraulic shovel calibration system according to any one of the first to fourth aspects wherein the external measurement device is a total station.

A hydraulic shovel calibration method according to a sixth aspect of the present invention is a method for calibrating parameters in a hydraulic shovel. The hydraulic shovel includes a travel unit, a pivoting body, a work implement, an angle detection unit, and a current position computation unit. The pivoting body is rotatably attached to the travel unit. A boom is swingably attached to the pivoting body. An arm is swingably attached to the boom. A work tool is swingably attached to the arm. The angle detection unit detects a swing angle of the boom with respect to the pivoting body, a swing angle of the arm with respect to the boom, and a swing angle of the work tool with respect to the arm. The current position computation unit computes the current position of a working point included in the work tool based on a plurality of parameters that indicate the dimensions and the swing angles of the boom, the arm, and the work tool. The hydraulic shovel calibration method comprises the following first step to fifth step. The first step is measuring the position of a working point using an external measurement device. The second step is inputting first working point position information and second working point position information into a calibration device for calibrating the parameters. The first information either includes at least two positions of the working point where the posture of the work implement is different and a position of a predetermined reference point on an action plane of the work implement, at least the two positions and the position of the predetermined reference point being measured by the external measurement device or includes at least three positions of the working point where the posture of the work implement is different, at least the three positions being measured by the external measurement device. The second working point position information includes at least three positions of the working point where the rotation angle of the pivoting body with respect to the travel unit is different. The third step is computing a first unit normal vector perpendicular to the action plane of the work implement based on the first working point position information, a second unit normal vector perpendicular to the rotation plane of the pivoting body based on the second working point position information, and a third unit normal vector perpendicular to the first unit normal vector and the second unit normal vector, using the calibration device. The fourth step is converting coordinates at a plurality of positions of the working point measured by the external measurement device in the coordinate system of the external measurement device to those in the vehicle body coordinate system of the hydraulic shovel using the first unit normal vector, the second unit normal vector, and the third unit normal vector, using the calibration device. The fifth step is computing calibration values of the parameters based on the converted coordinates at the plurality of positions of the working point in the vehicle body coordinate system, using the calibration device.

In the hydraulic shovel calibration system according to the first aspect of the present invention, the coordinates at the plurality of positions of the working point which are measured using the external measurement device are converted into the vehicle body coordinate system. Then, the calibration values of the parameters are computed based on the converted coordinates at the plurality of positions of the working point in the vehicle body coordinate system. As a result, it is not necessary to actually measure the values of the parameters using a measurement means such a measuring tape. Alternatively, it is possible to reduce the number of parameters for which actual measurement is necessary. In addition, it is not necessary to perform rearrangement of the values of the parameters until the actual value and the computed value in the position coordinates match. Hereby, in the hydraulic shovel calibration system according to the present invention, it is possible to improve the accuracy of position detection of the working point and to shorten the calibration work time as well.

In the hydraulic shovel calibration system according to the second aspect of the present invention, a unit normal vector perpendicular to a rotation plane specified from second working point position information is not used as the second unit normal vector. But at first, the intersection vector of the action plane of the work implement and the rotation plane of the pivoting body is computed. Then, a unit normal vector of a plane, which passes through the intersection vector of the action plane of the work implement and the rotation plane and which is perpendicular to the work implement, is computed as the second unit normal vector. As a result, even in a case where the action plane of the work implement and the rotation plane of the pivoting body are not strictly perpendicular, it is possible to accurately compute the vehicle body coordinate system. Hereby, it is possible to further improve the accuracy of position detection of the working point.

In the hydraulic shovel calibration system according to the third aspect of the present invention, the coordinates of the position of the swing pivot of the boom with respect to the pivoting body and the position of the working point with various work implement postures are included in first working point position information. As a result, it is possible to accurately compute the first unit normal vector perpendicular to the action plane of the work implement.

In the hydraulic shovel calibration system according to the fourth aspect of the present invention, the first distance, the second distance, and the third distance are included in the parameters. The current position computation unit computes the current position of the working point based on these distances. In addition, conversely by measuring the current position of the working point using the external measurement device, it is possible to accurately compute the calibration values of the first distance, the second distance, and the third distance from measurement results of the external measurement device.

In the hydraulic shovel calibration system according to the fifth aspect of the present invention, it is possible to easily measure the first operation position information and the second operation position information using the total station.

In the hydraulic shovel calibration system according to the sixth aspect of the present invention, the coordinates of the plurality of positions of the working point which are measured by the external measurement device are converted into the vehicle body coordinate system. Then, the calibration values of the parameters are computed based on the converted coordinates of the plurality of positions of the working point in the vehicle body coordinate system. As a result, it is not necessary to actually measure the values of the parameters using a measurement means such as a measuring tape. Alternatively, it is possible to reduce the number of parameters for which actual measurement is necessary. In addition, it is not necessary to perform rearrangement of the values of the parameters until the actual value and the computed value in the position coordinates match. Hereby, in the hydraulic shovel calibration method according to the present invention, it is possible to improve the accuracy of position detection of the working point and to shorten the calibration work time as well.

BRIEF DESCRIPTION OF DRAWINGS

FIG. 6A is a table indicating a list of parameters.

FIG. 6B is a table indicating a list of parameters.

DESCRIPTION OF THE EMBODIMENTS

1. Configuration 1-1. Overall Configuration of Hydraulic Shovel

Figure 1:
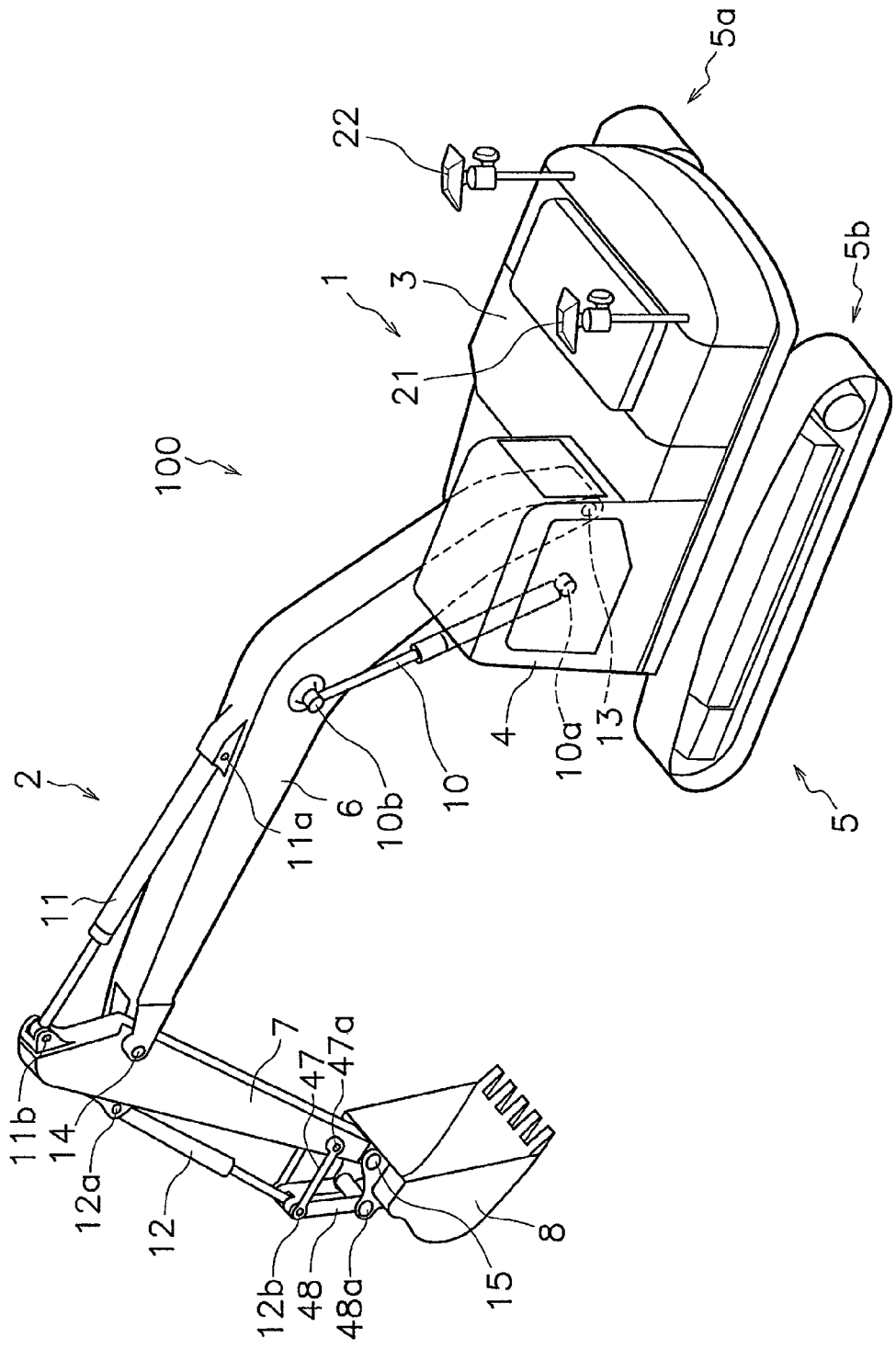
FIG. 1 is a perspective diagram of a hydraulic shovel according to an embodiment of the present invention.

Below, a calibration system and calibration method for a hydraulic shovel according to a first embodiment of the present invention will be described with reference to the drawings. FIG. 1 is a perspective diagram of a hydraulic shovel 100 which executes calibration using the calibration system. The hydraulic shovel 100 has a vehicle body 1 and a work implement 2. The vehicle body 1 has a pivoting body 3, a cab 4, and a travel unit 5. The pivoting body 3 is pivotally attached to the travel unit 5. The pivoting body 3 includes devices such as a hydraulic pump 37 (refer to FIG. 3), an engine which is not shown, and the like. The cab 4 is placed on a front portion of the pivoting body 3. A display input device 38 and an operation device 25 which will be described later are disposed in the cab 4 (refer to FIG. 3). The travel unit 5 has crawler tracks 5a and 5b and the hydraulic shovel 100 moves due to rotation of the crawler tracks 5a and 5b.

The work implement 2 is attached to a front portion of the vehicle body 1, and has a boom 6, an arm 7, a bucket 8, a boom cylinder 10, an arm cylinder 11, and a bucket cylinder 12. A base end portion of the boom 6 is swingably attached to a front portion of the vehicle body 1 with a boom pin 13. That is, the boom pin 13 corresponds to a swing pivot of the boom 6 with respect to the pivoting body 3. The base end portion of the arm 7 is swingably attached to a tip end portion of the boom 6 with an arm pin 14. That is, the arm pin 14 corresponds to a swing pivot of the arm 7 with respect to the boom 6. The bucket 8 is swingably attached to a tip end portion of the arm 7 with a bucket pin 15. That is, the bucket 15 corresponds to a swing pivot of the bucket 8 with respect to the arm 7.

FIGS. 2(a) to 2(c) are diagrams schematically illustrating a configuration of the hydraulic shovel 100. FIG. 2(a) is a side view of the hydraulic shovel 100. FIG. 2(b) is a rear view of the hydraulic shovel 100. FIG. 2(c) is a top view of the hydraulic shovel 100. As shown in FIG. 2(a), L1 is a length of the boom 6, i.e., a length between the boom pin 13 and the arm pin 14, which is equivalent to a first distance of the present invention. L2 is a length of the arm 7, i.e., a length between the arm pin 14 and the bucket pin 15, which is equivalent to a second distance of the present invention. L3 is a length of the bucket 8, i.e., a length between the bucket pin 15 and a cutting edge P of the bucket 8, which is equivalent to a third distance of the present invention.

The boom cylinder 10, the arm cylinder 11, and the bucket cylinder 12 which are shown in FIG. 1 are hydraulic cylinders each of which are driven using hydraulic pressure. A base end portion of the boom cylinder 10 is swingably attached to the pivoting body 3 with a boom cylinder foot pin 10a. In addition, a tip end portion of the boom cylinder 10 is swingably attached to the boom 6 with a boom cylinder top pin 10b. The boom cylinder 10 expands and contracts by using hydraulic pressure to drive the boom 6. A base end portion of the arm cylinder 11 is swingably attached to the boom 6 with an arm cylinder foot pin 11a. In addition, a tip end portion of the arm cylinder 11 is swingably attached to the arm 7 with an arm cylinder top pin 11b. The arm cylinder 11 expands and contracts by using hydraulic pressure to drive the arm 7. A base end portion of the bucket cylinder 12 is swingably attached to the arm 7 with a bucket cylinder foot pin 12a. In addition, a tip end portion of the bucket cylinder 12 is swingably attached to one end of a first link member 47 and one end of a second link member 48 with a bucket cylinder top pin 12b. The other end of the first link member 47 is swingably attached to the tip end portion of the arm 7 with a first link pin 47a. The other end of the second link member 48 is swingably attached to the bucket 8 with a second link pin 48a. The bucket cylinder 12 expands and contracts by using hydraulic pressure to drive the bucket.

Figure 2:
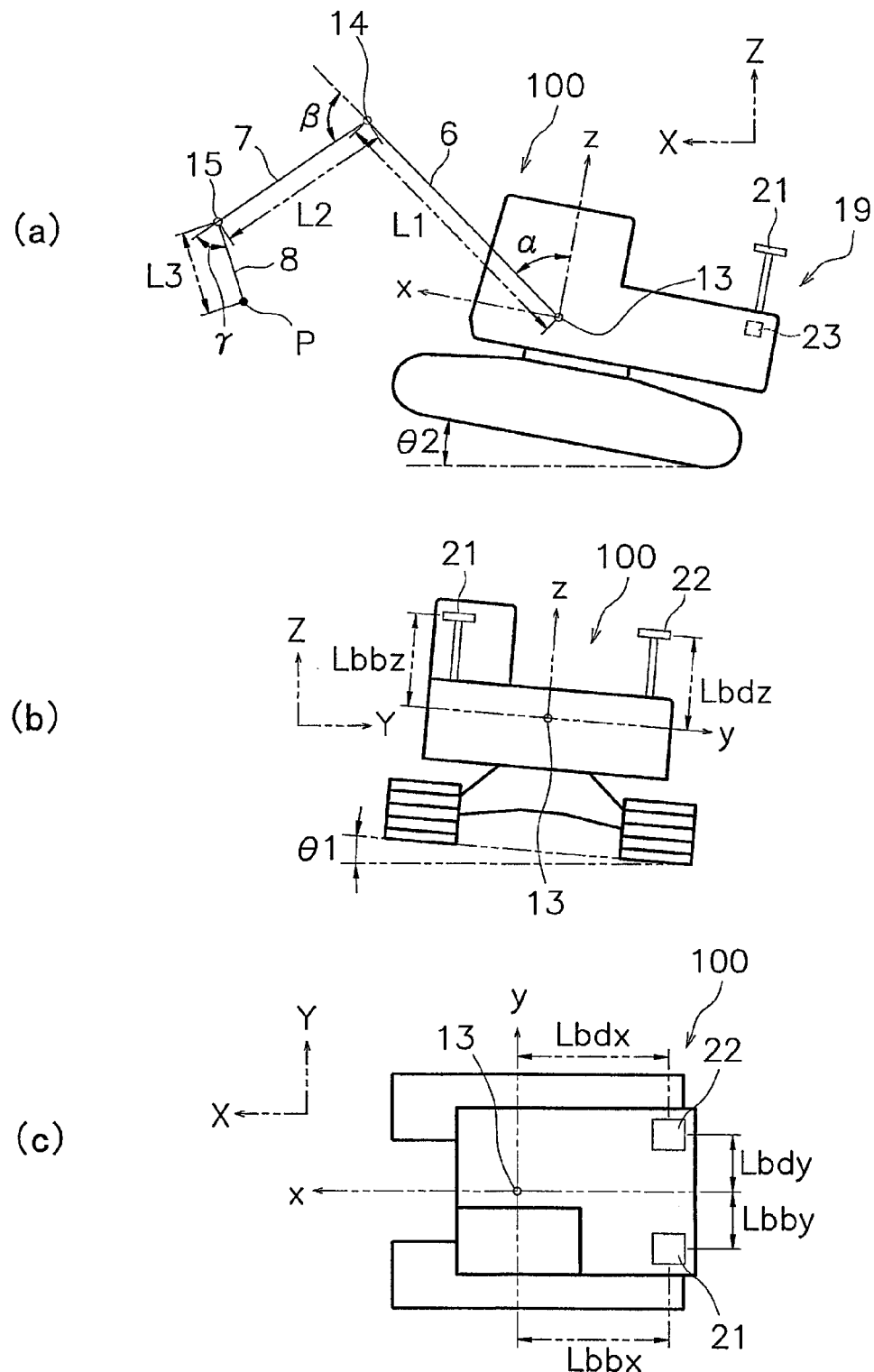
FIGS. 2(a) to 2(c) are diagrams schematically illustrating a configuration of the hydraulic shovel.
Figure 3:
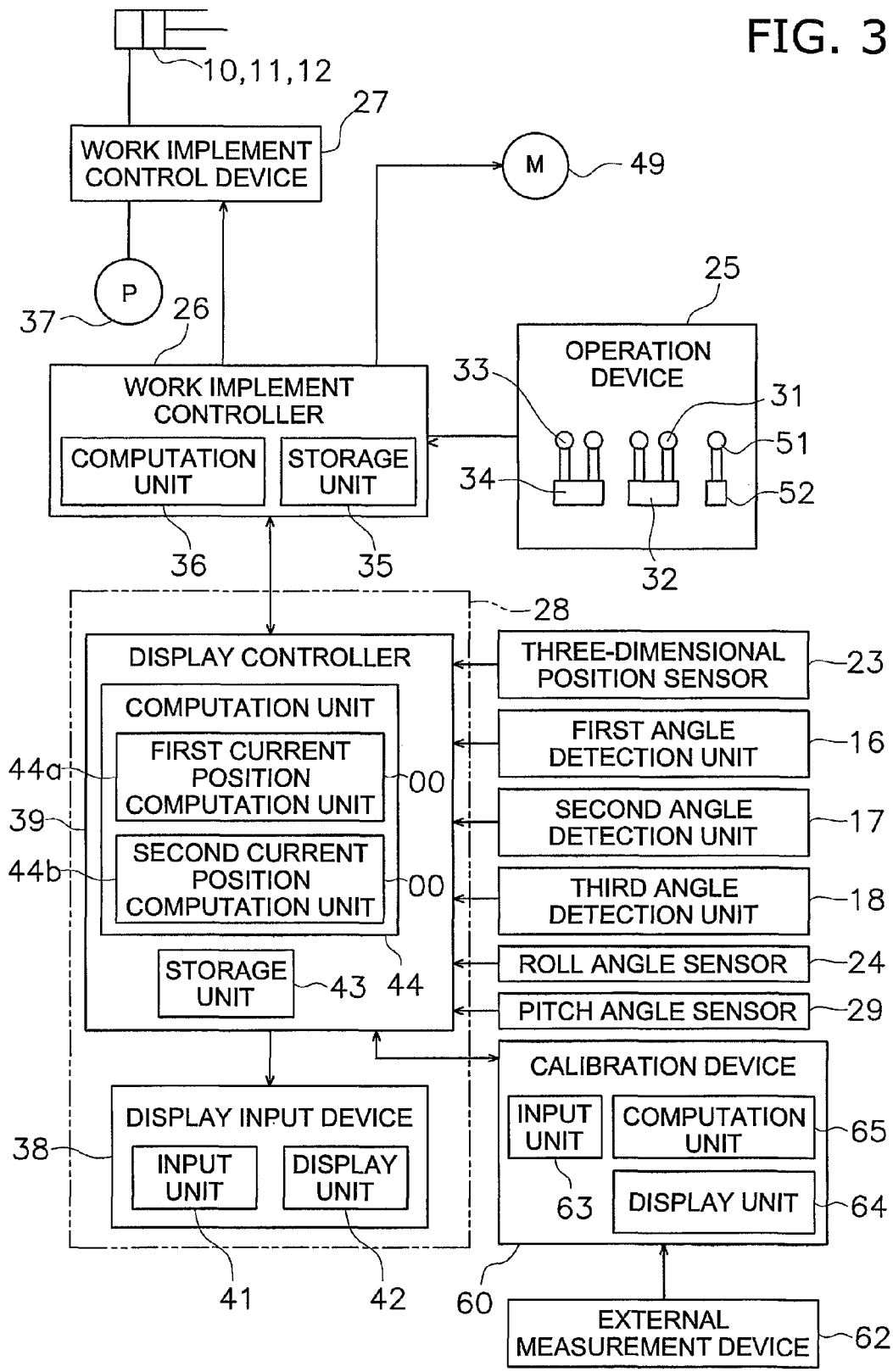
FIG. 3 is a block diagram illustrating a configuration of a control system provided with the hydraulic shovel.

FIG. 3 is a block diagram illustrating a configuration of a control system which the hydraulic shovel 100 comprises. First to third angle detection units 16 to 18 are respectively provided in the boom 6, the arm 7, and the bucket 8. The first to third angle detection units 16 to 18 are stroke sensors and indirectly detect a swing angle of the boom 6 with respect to the vehicle body 1, a swing angle of the arm 7 with respect to the boom 6, and a swing angle of the bucket 8 with respect to the arm 7 by respectively detecting the stroke lengths of the cylinders 10 to 12. Specifically, the first angle detection unit 16 detects the stroke length of the boom cylinder 10. A display controller 39 which will be describer later computes a swing angle $\alpha$ of the boom 6 with respect to the z axis of a vehicle body coordinate system shown in FIG. 2(a) from the stroke length of the boom cylinder 10 which is detected by the first angle detection unit 16. The second angle detection unit 17 detects the stroke length of the arm cylinder 11. The display controller 39 computes a swing angle $\beta$ of the arm 7 with respect to the boom 6 from the stroke length of the arm cylinder 11 which is detected by the second angle detection unit 17. The third angle detection unit 18 detects the stroke length of the bucket cylinder 12. The display controller 39 computes a swing angle $\gamma$ of the bucket 8 with respect to the arm 7 from the stroke length of the bucket cylinder 12 which is detected by the third angle detection unit 18. A method for computing the swing angles $\alpha$, $\beta$, and $\gamma$ will be described in detail later.

As shown in FIG. 2(a), a position detection unit 19 is provided in the vehicle body 1. The position detection unit 19 detects the current position of the vehicle body 1 of the hydraulic shovel 100. The position detection unit 19 has two antennas 21 and 22 for RTK-GNSS (Real Time Kinematic—Global Navigation Satellite Systems) which are shown in FIG. 1 and a three-dimensional position sensor 23 which is shown in FIG. 2(a). The antennas 21 and 22 are arranged to be separated by a certain distance along the y axis (refer to FIG. 2(c)) of the vehicle body coordinate system x-y-z which will be described later. A signal according to GNSS radio waves received by the antennas 21 and 22 is input into the three-dimensional position sensor 23. The three-dimensional position sensor 23 detects the current position of the antennas 21 and 22 in a global coordinate system. Here, the global coordinate system is a coordinate system which is measured using GNSS and is a coordinate system with respect to an origin which is fixed on the earth. In contrast to this, the vehicle body coordinate system which will be described later is a coordinate system with respect to an origin which is fixed on the vehicle body 1 (specifically, the pivoting body 3). The antenna 21 (referred to below as the "reference antenna 21") is an antenna for detecting the current position of the vehicle body 1. The antenna 22 (referred to below as the "direction antenna 22") is an antenna for detecting the orientation of the vehicle body 1 (specifically, the pivoting body 3). The position detection unit 19 detects the angle of direction of the x axis of the vehicle body coordinate system in the global coordinate system which will be described later using the positions of the reference antenna 21 and the direction antenna 22. Here, the antennas 21 and 22 may be GPS antennas.

As shown in FIG. 3, a roll angle sensor 24 and a pitch angle sensor 29 are provided in the vehicle body 1. The roll angle sensor 24 detects an inclination angle $\theta1$ (referred to below as the "roll angle $\theta1$") in the widthwise direction of the vehicle body 1 with respect to the direction of gravity (the vertical direction) as shown in FIG. 2(b). Here, in the embodiment, the widthwise direction has the meaning of the widthwise direction of the bucket 8 and matches with the vehicle widthwise direction. However, the widthwise direction of the bucket 8 and the vehicle widthwise direction may not match in a case where the work implement 2 is provided with a tilt bucket which will be described later. The pitch angle sensor 29 detects an inclination angle $\theta2$ (referred to below as the "pitch angle $\theta2$") in the front and back direction of the vehicle body 1 with respect to the direction of gravity as shown in FIG. 2(a).

As shown in FIG. 3, the hydraulic shovel 100 comprises the operation device 25, a work implement controller 26, a work implement control device 27, and the hydraulic pump 37. The operation device 25 has a work implement operation member 31, a work implement operation detection unit 32, a travel operation member 33, a travel operation detection unit 34, a rotation operation member 51, and a rotation operation detection unit 52. The work implement operation member 31 is a member for an operator to operate the work implement 2 and is, for example, an operation lever. The work implement operation detection unit 32 detects details of operation inputted by using the work implement operation member 31 and transmits the details to the work implement controller 26 as a detection signal. The travel operation member 33 is a member for an operator to operate the travelling of the hydraulic shovel 100 and is, for example, an operation lever. The travel operation detection unit 34 detects details of operation inputted by using the travel operation member 33 and transmits the details to the work implement controller 26 as a detection signal. The rotation operation member 51 is a member for an operator to operate the rotation of the pivoting body 3 and is, for example, an operation lever. The rotation operation detection unit 52 detects details of operation inputted by using the rotation operation member 51 and transmits the details to the work implement controller 26 as a detection signal.

The work implement controller 26 has a storage unit 35 such as a RAM or a ROM and a computation unit 36 such as a CPU. The work implement controller 26 mainly controls the actions of the work implement 2 and the rotation of the pivoting body 3. The work implement controller 26 generates a control signal for causing the work implement 2 to carry out actions according to the operation of the work implement operation member 31 and outputs the control signal to the work implement control device 27. The work implement control device 27 has a hydraulic control machine such as a proportional control valve. The work implement control device 27 controls the flow amount of hydraulic fluid which is supplied from the hydraulic pump 37 to the hydraulic cylinders 10 to 12 based on the control signal from the work implement controller 26. The hydraulic cylinders 10 to 12 are driven according to the hydraulic fluid which is supplied from the hydraulic pump 37. Hereby, the work implement 2 carries out the actions. In addition, the work implement controller 26 generates a control signal in order to carry out rotation of the pivoting body 3 according to the operation of the rotation operation member 51 and outputs the control signal to a rotation motor 49. Hereby, the rotation motor 49 is driven and rotation of the pivoting body 3 is carried out.

1-2. Configuration of Display System 28

A display system 28 is mounted in the hydraulic shovel 100. The display system 28 is a system for providing information to an operator in order to form a shape such as a design surface which will be described later by digging the ground surface in a work area. The display system 28 has the display input device 38 and the display controller 39.

The display input device 38 has an input unit 41 like a touch panel and a display unit 42 such as an LCD. The display input device 38 displays a guidance screen for providing information for digging operation. In addition, various types of keys are displayed in the guidance screen. The operator can execute various types of functions of the display system 28 by touching the various types of keys on the guidance screen. The guidance screen will be displayed later in detail.

The display controller 39 executes the various types of functions of the display system 28. The display controller 39 and the work implement controller 26 are able to communicate with each other using a wireless or wired communication means. The display controller 39 has a storage unit 43 such as a RAM or a ROM and a computation unit 44 such as a CPU. The computation unit 44 executes various types of computations in order to display the guidance screen based on various types of data stored in the storage unit 43 and the detection results of the position detection unit 19.

Figure 4:
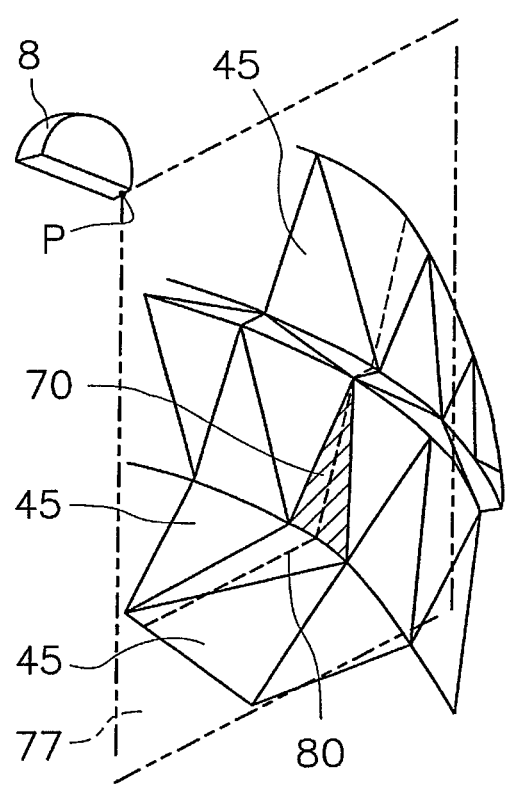
FIG. 4 is a diagram illustrating an example of a configuration of design terrain.

Design terrain data is created in advance and stored in the storage unit 43 of the display controller 39. The design terrain data is information relating to the three-dimensional shape and positions of the design terrain. The design terrain indicates a target shape of the ground surface which is a work target. The display controller 39 displays the guidance screen on the display input device 38 based on the design terrain data and data from the detection result of the various types of sensors described above. Specifically, the design terrain is configured using a plurality of design surfaces 45 which are each represented by a triangular polygon as shown in FIG. 4. Here, only some out of the plurality of design surfaces in FIG. 4 are given the reference numeral 45 and the reference numerals of the other design surfaces are omitted. The operator selects one or a plurality of the design surfaces 45 out of the design surfaces 45 as a target surface 70. The display controller 39 displays the guidance screen on the display input device 38 in order to notify the operator of the position of the target surface 70.

2. Guidance Screen

Below, the guidance screen will be described in detail. The guidance screen is a screen which indicates the positional relationship of the target surface 70 and the cutting edge of the bucket 8 and for guiding the work implement 2 of the hydraulic shovel 100 so that the ground surface which is the target surface becomes a shape which is the same as the target surface 70.

2-1. Configuration of Guidance Screen

Figure 5:
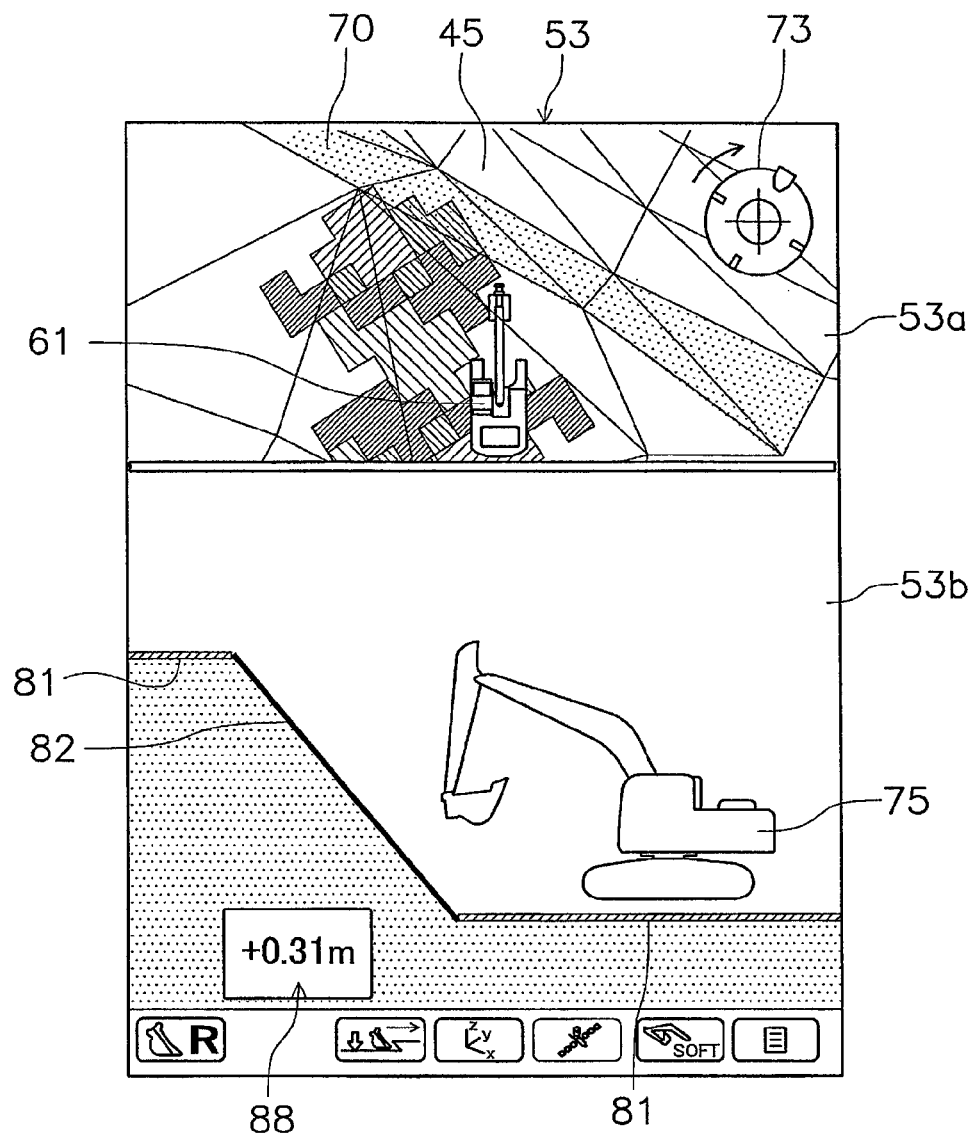
FIG. 5 is a diagram illustrating an example of a guidance screen.

A guidance screen 53 is illustrated in FIG. 5. The guidance screen 53 includes an upper view 53a illustrating the design terrain of the work area and the current position of the hydraulic shovel 100 and a side view 53b illustrating the positional relationship of the target surface 70 and the hydraulic shovel 100.

The upper view 53a on the guidance screen 53 represents the design terrain as viewed from above using a plurality of triangular polygons. More specifically, the upper view 53a represents the design terrain with the rotation plane of the hydraulic shovel 100 as a projection surface. Accordingly, the upper view 53a is a view directly from above the hydraulic shovel 100 and the design surfaces 45 tilt when the hydraulic shovel 100 tilts. In addition, the target surface 70 selected from the plurality of design surfaces 45 is displayed with a different color from the other design surfaces 45. Here, the current position of the hydraulic shovel 100 is shown in FIG. 5 with a hydraulic shovel icon 61 as seen from above but may be displayed using another symbol. In addition, the upper view 53a includes information for bringing the hydraulic shovel 100 directly face-to-face with the target surface 70. The information for bringing the hydraulic shovel 100 directly face-to-face with the target surface 70 is displayed as a facing compass 73. The facing compass 73 is an icon indicating a direction directly facing the target surface 70 and a direction of the hydraulic shovel 100 to rotate. The operator can confirm the degrees to which the shovel faces the target surface 70 using the facing compass 73.

The side view 53b of the guidance screen 53 includes an image showing the positional relationship of the target surface 70 and the cutting edge of the bucket 8 and the distance information 88 indicating the distance between the target surface 70 and the cutting edge of the bucket 8. Specifically, the side view 53b includes a design surface line 81, a target surface line 82, and an icon 75 of the hydraulic shovel 100 as seen from the side. The design surface line 81 indicates a cross section of the design surfaces 45 other than the target surface 70. The target surface line 82 indicates a cross section of the target surface 70. As shown in FIG. 4, the design surface line 81 and the target surface line 82 are obtained by computing an intersection 80 of the design surface 45 and a plane 77, which passes through the current position of a midpoint P of the cutting edge of the bucket 8 in the widthwise direction (referred to below simply as the "cutting edge of the bucket 8"). The method for computing the current position of the cutting edge of the bucket 8 will be described in detail later.

As above, the relative positional relationship of the design surface line 81, the target surface line 82, and the hydraulic shovel 100 including the bucket 8 is displayed in the guidance screen 53 using images. The operator can set the cutting edge of the bucket 8 to move along the target surface line 79 so that the current terrain becomes the design terrain, which leads to easy operation of digging.

2-2. Cutting Edge Position Computation Method

Next, the method for computing the position of the cutting edge of the bucket 8 described above will be described in detail. The computation unit 44 of the display controller 39 computes the current position of the cutting edge of the bucket 8 based on the detection results of the position detection unit 19 and a plurality of parameters stored in the storage unit 43. Lists of parameters stored in the storage unit 43 are shown in FIGS. 6A and 6B. The parameters include work implement parameters and antenna parameters. The work implement parameters include a plurality of parameters that indicate the dimensions and the swing angles of the boom 6, the arm 7, and the bucket 8. The antenna parameters include a plurality of parameters that indicate the positional relationship of the antennas 21 and 22 and the boom 6. As shown in FIG. 3, the computation unit 44 of the display controller 39 has a first current position computation unit 44a and a second current position computation unit 44b. The first current position computation unit 44a computes the current position of the cutting edge of the bucket 8 in the vehicle body coordinate system based on the work implement parameters. The second current position computation unit 44b computes the current position of the cutting edge of the bucket 8 in the global coordinate system from the antenna parameters, the current positions of the antennas 21 and 22 in the global coordinate system which are detected by the position detection unit 19, and the current position of the cutting edge of the bucket 8 in the vehicle body coordinate system which is computed by the first current position computation unit 44a. Specifically, the current position of the cutting edge of the bucket 8 is obtained as follows.

First, as shown in FIG. 2, the vehicle body coordinate system x-y-z is set whose origin is the intersection of the shaft of the boom pin 13 and the action plane of the work implement 2 which will be described later. Here, the position of the boom pin 13 in the description below means a position of a midpoint of the boom pin 13 in the vehicle widthwise direction. In addition, the current swing angles $\alpha$, $\beta$, and $\gamma$ of the boom 6, the arm 7, and the bucket 8 respectively, which are described above, are computed from the detection results of the first to the third angle detection units 16 to 18. The method for computing the swing angles $\alpha$, $\beta$, and $\gamma$ will be described later. The coordinates (x, y, z) of the cutting edge of the bucket 8 in the vehicle body coordinate system are computed with equation 1 below using the swing angles $\alpha$, $\beta$, and $\gamma$ of the boom 6, the arm 7, and the bucket 8 respectively and the lengths L1, L2, and L3 of the boom 6, the arm 7, and the bucket 8 respectively.

$$x = L1 \sin\alpha + L2 \sin(\alpha+\beta) + L3 \sin(\alpha+\gamma)$$

$$y = 0$$

$$z = L1 \cos\alpha + L2 \cos(\alpha+\beta) + L3 \cos(\alpha+\gamma) \quad \text{Equation 1}$$

In addition, the coordinates (x, y, z) of the cutting edge of the bucket 8 in the vehicle body coordinate system which are obtained from equation 1 are converted to coordinates (X, Y, Z) in the global coordinate system using equation 2 below.

$$\begin{pmatrix} X \\ Y \\ Z \end{pmatrix} = \begin{pmatrix} \cos\kappa\cos\varphi & \cos\kappa\sin\varphi\sin\omega + \sin\kappa\cos\omega & -\cos\kappa\sin\varphi\cos\omega + \sin\kappa\sin\omega \\ -\sin\kappa\cos\varphi & -\sin\kappa\sin\varphi\sin\omega + \cos\kappa\cos\omega & \sin\kappa\sin\varphi\cos\omega + \cos\kappa\sin\omega \\ \sin\varphi & -\cos\varphi\sin\omega & \cos\varphi\cos\omega \end{pmatrix} \begin{pmatrix} x \\ y \\ z \end{pmatrix} + \begin{pmatrix} A \\ B \\ C \end{pmatrix} \quad \text{Equation 2}$$

Here, $\omega$, $\phi$, and $\kappa$ are expressed as below.

$$\omega = \arcsin\left(\frac{\sin\theta 1}{\cos\varphi}\right)$$

$$\varphi = \theta 2$$

$$\kappa = -\theta 3$$

Here, as described above, $\theta 1$ is the roll angle. $\theta 2$ is the pitch angle. In addition, $\theta 3$ is a yaw angle and is a direction angle of the x axis of the vehicle body coordinate system in the global coordinate system which is described above. Accordingly, the yaw angle $\theta 3$ is computed based on the positions of the reference antenna 21 and the direction antenna 22 which are detected by the positioned detection unit 19. (A, B, C) are coordinates of the origin of the vehicle body coordinate system in the global coordinate system. The antenna parameters described above indicate the positional relationship of the antenna 21 and 22 and the origin of the vehicle body coordinate system, i.e., the positional relationship of the antennas 21 and 22 and the midpoint of the boom pin 13 in the vehicle widthwise direction. Specifically, as shown in FIG. 2(b) and FIG. 2(c), the antenna parameters include a distance Lbbx between the boom pin 13 and the reference antenna 21 in the x axial direction of the vehicle body coordinate system, a distance Lbby between the boom pin 13 and the reference antenna 21 in the y axial direction of the vehicle body coordinate system, and a distance Lbbz between the boom pin 13 and the reference antenna 21 in the z axial direction of the vehicle body coordinate system. In addition, the antenna parameters include a distance Lbdx between the boom pin 13 and the direction antenna 22 in the x axial direction of the vehicle body coordinate system, a distance Lbdy between the boom pin 13 and the direction antenna 22 in the y axial direction of the vehicle body coordinate system, and a distance Lbdz between the boom pin 13 and the direction antenna 22 in the z axial direction of the vehicle body coordinate system. (A, B, C) is computed based on the antenna parameters and the coordinates of the antennas 21 and 22 in the global coordinate system, where the antennas 21 and 22 are detected.

As shown in FIG. 4, the display controller 39 computes the intersection 80 of the three-dimensional design terrain and the plane 77 which passes through the cutting edge of the bucket 8, based on the current position of the cutting edge P of the bucket 8 computed as described above and the design terrain data stored in the storage unit 43. Then, the display controller 39 computes a portion out of the intersection 80 which passes through the target surface 70 as the target surface line 82 described above. A portion out of the intersection 80 other than the target surface line 82 is computed as the design surface line 81.

2-3. Method for Computing Swing Angles $\alpha$, $\beta$, and $\gamma$

Next, a method for computing the current swing angles $\alpha$, $\beta$, and $\gamma$ of the boom 6, the arm 7, and the bucket 8 from the detection results of the first to the third angle detection units 16 to 18 will be described.

Figure 7:
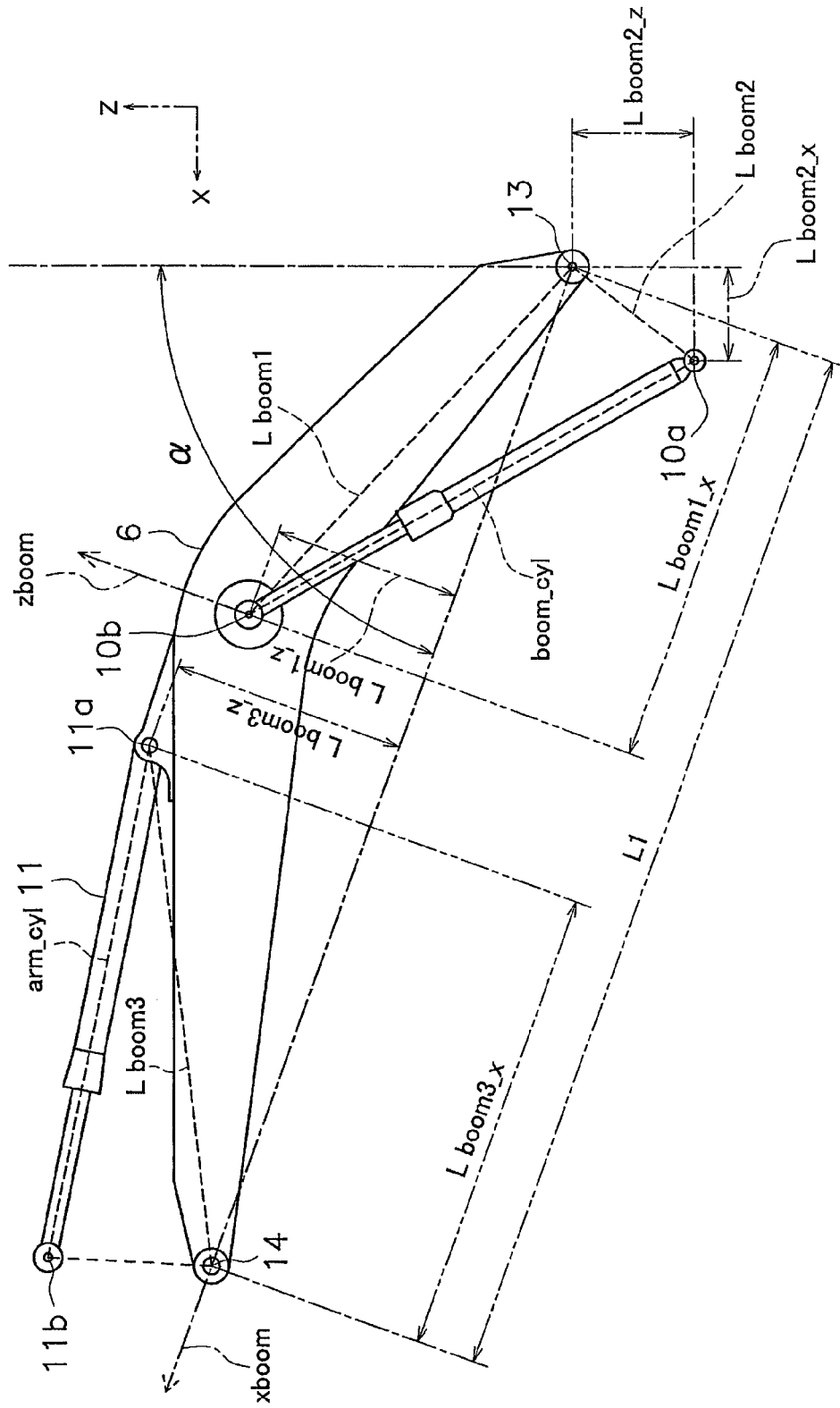
FIG. 7 is a side view of a boom.

FIG. 7 is a side view of the boom 6. The swing angle α of the boom 6 is expressed by equation 3 below with the work implement parameters shown in FIG. 7.

$$\alpha = \arctan\left(-\frac{Lboom2\_x}{Lboom2\_z}\right) -$$
$$\arccos\left(\frac{Lboom1^2 + Lboom2^2 - boom\_cyl^2}{2*Lboom1*Lboom2}\right) +$$
$$\arctan\left(\frac{Lboom1\_z}{Lboom1\_x}\right)$$

Equation 3

As shown in FIG. 7, Lboom__2x is a distance between the boom cylinder foot pin 10a and the boom pin 13 in the horizontal direction of the vehicle body 1 where the boom 6 is attached (that is, equivalent to the x axial direction in the vehicle body coordinate system). Lboom__2z is a distance between the boom cylinder foot pin 10a and the boom pin 13 in the vertical direction of the vehicle body 1 where the boom 6 is attached (that is, equivalent to the z axial direction in the vehicle body coordinate system). Lboom1 is a distance between the boom cylinder top pin 10b and the boom pin 13. Lboom2 is a distance between the boom cylinder foot pin 10a and the boom pin 13. boom_cyl is a distance between the boom cylinder foot pin 10a and the boom cylinder top pin 10b. Lboom1_z is a distance between the boom cylinder top pin 10b and the boom pin 13 in a zboom axial direction. Here, a direction which links the boom pin 13 and the arm pin 14 as seen from the side is set as an xboom axis and a direction that is perpendicular to the xboom axis is set as a zboom axis. Lboom1_x is a distance between the boom cylinder top pin 10b and the boom pin 13 in an xboom axial direction.

Figure 8:
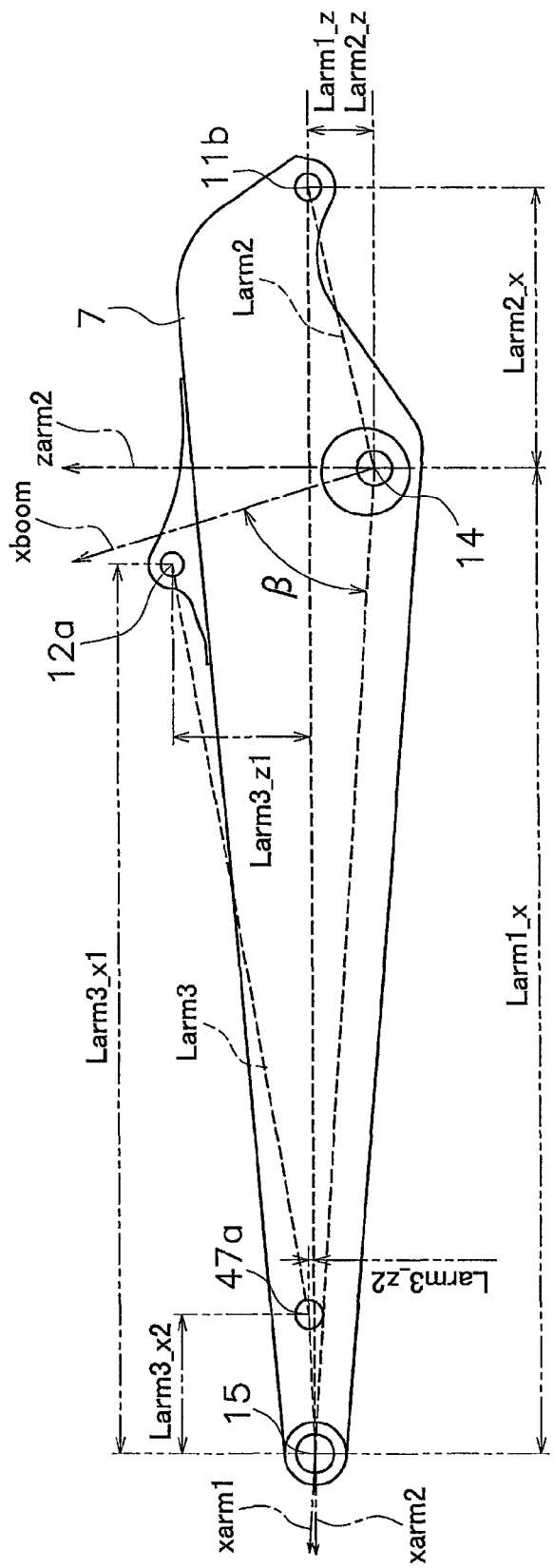
FIG. 8 is a side view of an arm.

FIG. 8 is a side view of the arm 7. The swing angle β of the arm 7 is expressed by equation 4 below using the work implement parameters which are shown in FIG. 7 and FIG. 8.

$$\beta = \arctan\left(-\frac{Lboom3\_z}{Lboom3\_x}\right) +$$
$$\arccos\left(\frac{Lboom3^2 + Larm2^2 - arm\_cyl^2}{2*Larm3*Larm2}\right) +$$
$$\arctan\left(\frac{Larm2\_x}{Larm2\_z}\right) + \arctan\left(\frac{Larm1\_x}{Larm1\_z}\right) - \pi$$

Equation 4

As shown in FIG. 7, Lboom3_z is a distance between the arm cylinder foot pin 11a and the arm pin 14 in the zboom axial direction. Lboom3_x is a distance between the arm cylinder foot pin 11a and the arm pin 14 in the xboom axial direction. Lboom3 is a distance between the arm cylinder foot pin 11a and the arm pin 14. As shown in FIG. 8, Larm2 is a distance between the arm cylinder top pin 11b and the arm pin 14. As shown in FIG. 7, arm_cyl is a distance between the arm cylinder foot pin 11a and the arm cylinder top pin 11b. As shown in FIG. 8, Larm2_x is a distance between the arm cylinder top pin 11b and the arm pin 14 in an xarm2 axial direction. Larm2_z is a distance between the arm cylinder top pin 11b and the arm pin 14 in a zarm2 axial direction. Here, a direction which links the arm cylinder top pin 11b and the bucket pin 15 as seen from the side is set as an xarm2 axis and a direction that is perpendicular to the xarm2 axis is set as a zarm2 axis. Larm1_x is a distance between the arm pin 14 and the bucket pin 15 in the xarm2 axial direction. Larm1_z is a distance between the arm pin 14 and the bucket pin 15 in the zarm2 axial direction. Here, a direction which links the arm pin 14 and the bucket pin 15 as seen from the side is set as an xarm1 axis. The swing angle β of the arm 7 is an angle which is formed by the xboom axis and the xarm1 axis.

Figure 9:
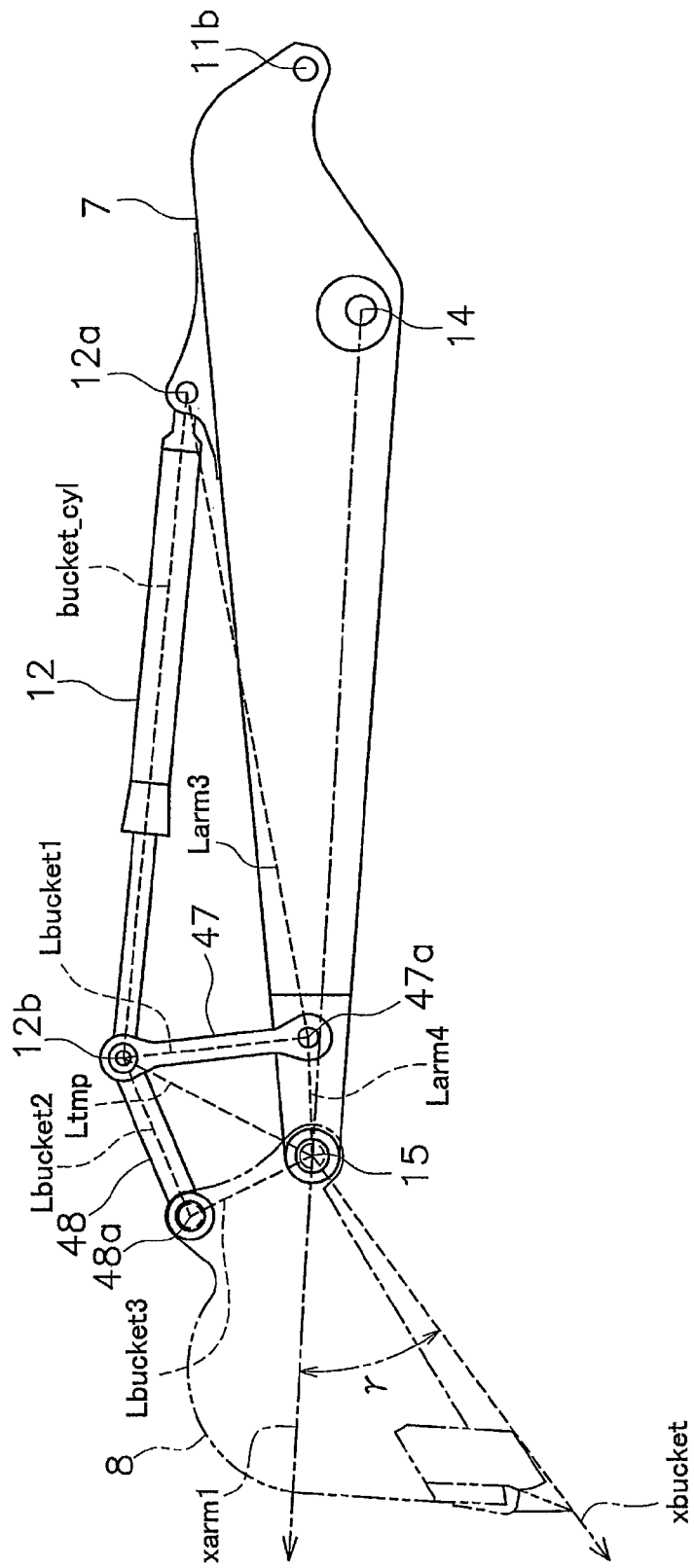
FIG. 9 is a side view of a bucket and the arm.
Figure 10:
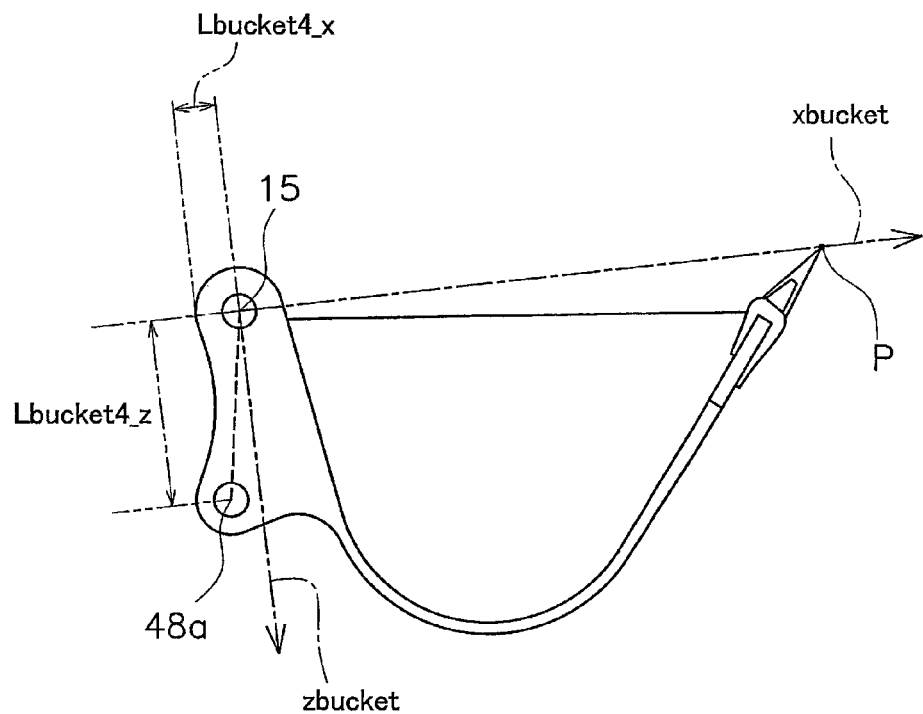
FIG. 10 is a side view of the bucket.

FIG. 9 is a side view of the bucket 8 and the arm 7. FIG. 10 is a side view of the bucket 8. The swing angle γ of the bucket 8 is expressed by equation 5 below using the work implement parameters which are shown in FIG. 8 to FIG. 10.

$$\gamma = \arctan\left(\frac{Larm1\_z}{Larm1\_x}\right) + \arctan\left(\frac{Larm3\_z2}{Larm3\_x2}\right) +$$
$$\arccos\left(\frac{Ltmp^2 + Larm4^2 - Lbucket1^2}{2*Ltmp*Larm4}\right) +$$
$$\arccos\left(\frac{Ltmp^2 + Lbucket3^2 - Lbucket2^2}{2*Ltmp*Lbucket3}\right) +$$
$$\arctan\left(\frac{Lbucket4\_x}{Lbucket4\_z}\right) + \frac{\pi}{2} - \pi$$

Equation 5

As shown in FIG. 8, Larm3_z2 is a distance between the first link pin 47a and the bucket pin 15 in the zarm2 axial direction. Larm3_x2 is a distance between the first link pin 47a and the bucket pin 15 in the xarm2 axial direction. As shown in FIG. 9, Ltmp is a distance between the bucket cylinder top pin 12b and the bucket pin 15. Larm4 is a distance between the first link pin 47a and the bucket pin 15. Lbucket1 is a distance between the bucket cylinder top pin 12b and the first link pin 47a. Lbucket3 is a distance between the bucket pin 15 and the second link pin 48a. Lbucket2 is a distance between the bucket cylinder top pin 12b and the second link pin 48a. As shown in FIG. 10, Lbucket4_x is a distance between the bucket pin 15 and the second link pin 48a in an xbucket axial direction. Lbucket4_z is a distance between the bucket pin 15 and the second link pin 48a in a zbucket axial direction. Here, a direction which links the bucket pin 15 and the cutting edge P of the bucket 8 as seen from the side is set as an xbucket axis and a direction that is perpendicular to the xbucket axis is set as a zbucket axis. The swing angle γ of the bucket 8 is an angle which is formed by the xbucket axis and the xarm1 axis. Ltmp described above is expressed by equation 6 below.

$$Ltmp = \sqrt{Larm4^2 + Lbucket1^2 - 2Larm4*Lbucket1*\cos\phi}$$

Equation 6

$$\phi = \pi + \sqrt{\frac{Larm3\_z2}{Larm3\_x2}} - \sqrt{\frac{Larm3\_z1 - Larm3\_z2}{Larm3\_x1 - Larm3\_x2}} -$$
$$\arccos\left\{\frac{Lbucket1^2 + Larm3^2 - bucket\_cyl^2}{2*Lbucket1*Larm3}\right\}$$

Here, as shown in FIG. 8, Larm3 is a distance between the bucket cylinder foot pin 12a and the first link pin 47a. Larm3_x1 is a distance between the bucket cylinder foot pin 12a and the bucket pin 15 in the xarm2 axial direction. Larm3_z1 is a distance between the bucket cylinder foot pin 12a and the bucket pin 15 in the zarm2 axial direction.

Figure 11:
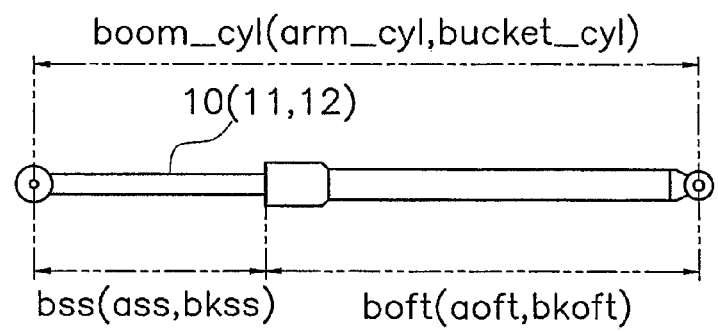
FIG. 11 is a diagram illustrating a method for computing parameters that indicate the length of cylinders.

In addition, boom_cyl described above is a value obtained by adding a boom cylinder offset boft to a stroke length bss of the boom cylinder 10 which is detected by the first angle detection unit 16 as shown in FIG. 11. In the same manner, arm_cyl is a value obtained by adding an arm cylinder offset aoft to a stroke length as of the arm cylinder 11 which is detected by the second angle detection unit 17. In the same manner, bucket_cyl is a value obtained by adding a bucket cylinder offset bkoft which includes the minimum distance of the bucket cylinder 12 to a stroke length bkss of the bucket cylinder 12 which is detected by the third angle detection unit 18.

3. Calibration Device 60

The calibration device 60 is a device in the hydraulic shovel 100 for calibrating the parameters which are necessary for computing the swing angles α, β, and γ described above and computing the position of the cutting edge of the bucket 8. The calibration device 60 is configured by a calibration system for calibrating the parameters described above along with the hydraulic shovel 100 and an external measurement device 62. The external measurement device 62 is a device which measures the position of the cutting edge of the bucket 8, and for example, is a total station. The calibration device 60 can perform wired or wireless data communication with the external measurement device 62. In addition, the calibration device 60 can perform wired or wireless data communication with the display controller 39. The calibration device 60 performs calibration of the parameters shown in FIGS. 6A and 6B based on information that is measured using the external measurement device 62. The calibration of the parameters is executed, for example, in an initial setting at the time of shipping of the hydraulic shovel 100 or after maintenance.

Figure 12:
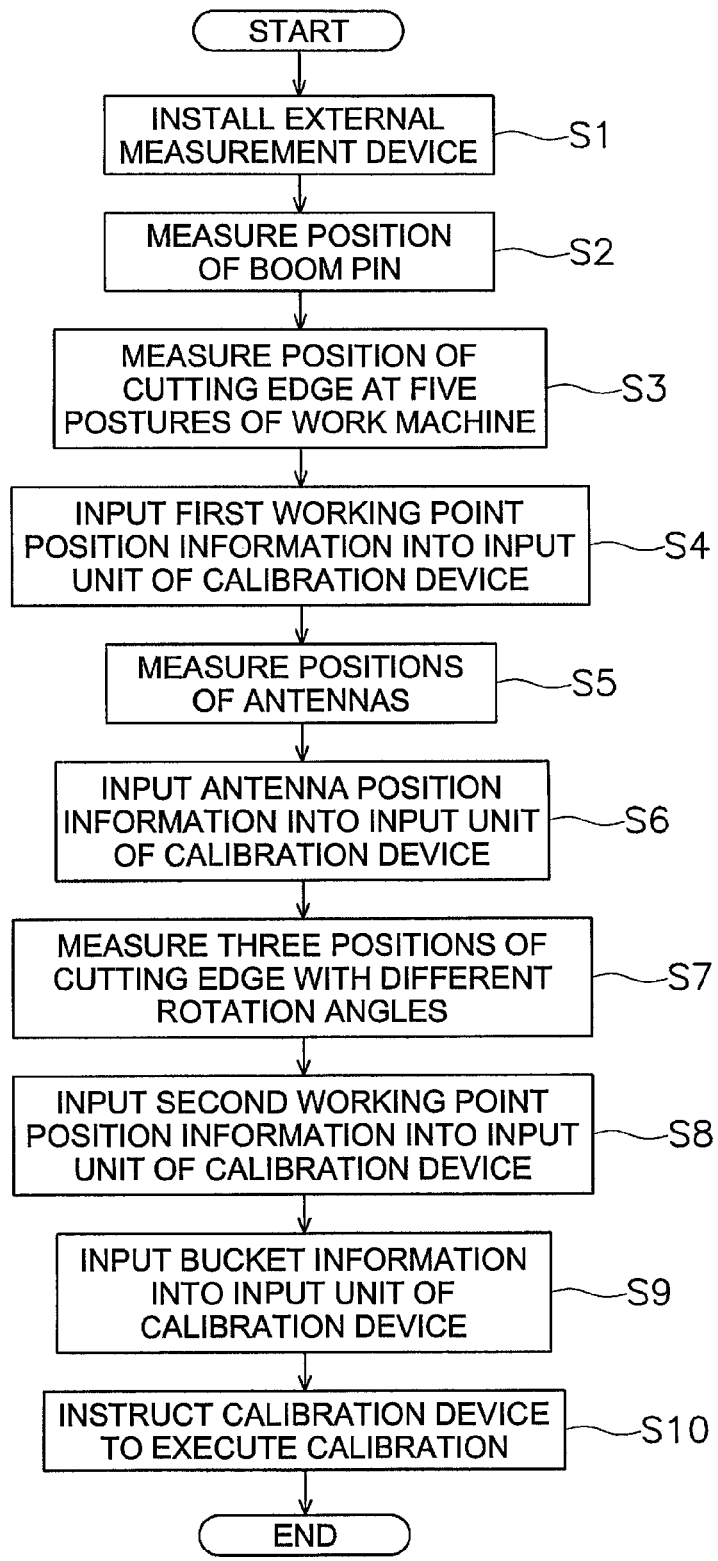
FIG. 12 is a flow chart illustrating a work sequence performed by an operator during calibration.
Figure 13:
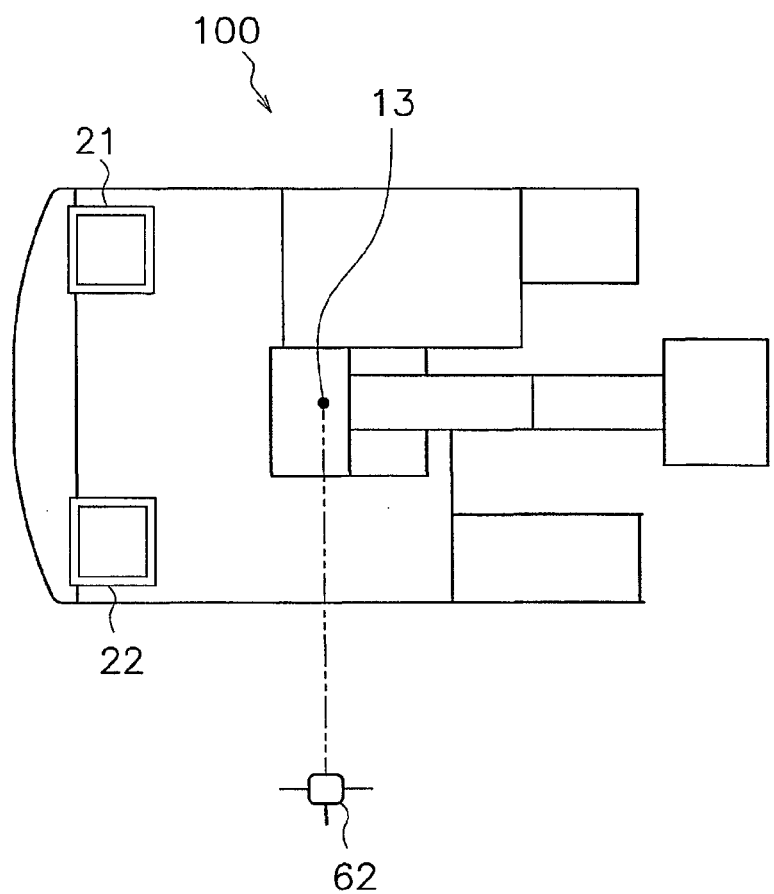
FIG. 13 is a diagram illustrating a setting position of an external measurement device.

FIG. 12 is a flow chart illustrating a work sequence which is performed by an operator during calibration. First, in step S1, the operator installs the external measurement device 62. At this time, the operator installs the external measurement device 62 with a spacing of a certain distance directly beside the boom pin 13 as shown in FIG. 13. In addition, in step S2, the operator measures the center position in the side surface of the boom pin 13 using the external measurement device 62.

Figure 14:
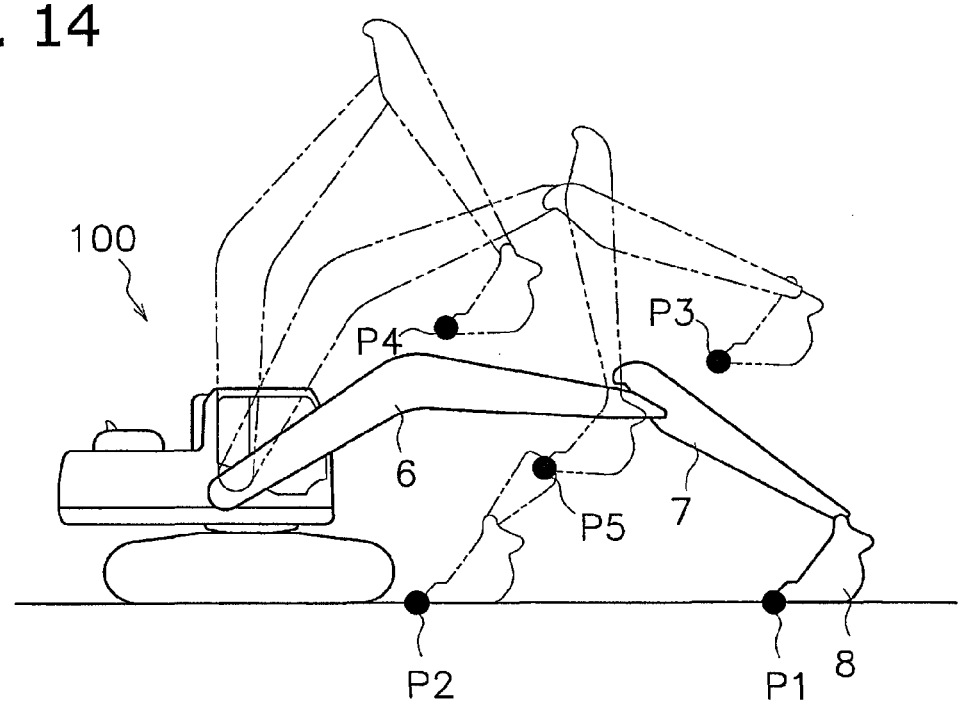
FIG. 14 is a side view of a position of a cutting edge in five postures of a work implement.
Figures 15, 16:
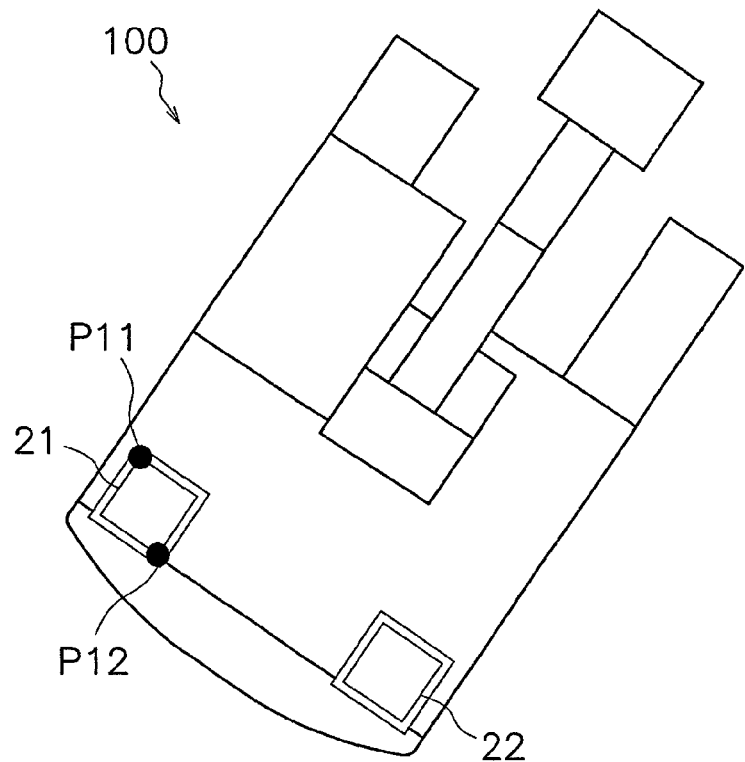
FIG. 15 is a table listing stroke lengths of cylinders corresponding to each position of a first to a fifth position.
FIG. 16 is a top view illustrating positions of a first measurement point and a second measurement point on a reference antenna.

In step S3, the operator measures the position of the cutting edge at five postures of the work implement 2 using the external measurement device 62. Here, the operator moves the position of the cutting edge of the bucket 8 to five positions from a first position P1 to a fifth position P5 shown in FIG. 14 by operating the work implement operation member 31. At this time, the pivoting body 3 is continuously fixed without rotation with respect to the travel unit 5. Then, the operator measures the coordinates of the cutting edge at each of the positions of the first position P1 to the fifth position P5 using the external measurement device 62. The first position P1 and the second position P2 are positions on the ground surface which are different in the front and back direction of the vehicle body. The third position P3 and the fourth position P4 are positions in midair which are different in the front and back direction of the vehicle body. The third position P3 and the fourth position P4 are positions which are different with regard to the first position P1 and the second position P2 in the upward and downward direction. The fifth position P5 is a position among the first position P1, the second position P2, the third position P3, and the fourth position P4. FIG. 15 lists the stroke lengths of each of the cylinders 10 to 12 at each of the positions of the first position P1 to the fifth position P5 with 100% as the maximum and 0% as the minimum. In the first position P1, the stroke length of the arm cylinder 11 is the minimum. That is, the first position P1 is a position of the cutting edge at a posture of the work implement 2 where the swing angle of the arm 7 is the minimum. In the second position P2, the stroke length of the arm cylinder 11 is the maximum. That is, the second position P2 is a position of the cutting edge at a posture of the work implement 2 where the swing angle of the arm 7 is the maximum. In the third position P3, the stroke length of the arm cylinder 11 is the minimum and the stroke length of the bucket cylinder 12 is the maximum. That is, the third position P3 is a position of the cutting edge at a posture of the work implement 2 where the swing angle of the arm 7 is the minimum and the swing angle of the bucket 8 is the maximum. In the fourth position P4, the stroke length of the boom cylinder 10 is the maximum. That is, the fourth position P4 is a position of the cutting edge at a posture of the work implement 2 where the swing angle of the boom 6 is the maximum. In the fifth position P5, the stroke lengths of all of the arm cylinder 11, the boom cylinder 10, or the bucket cylinder 12 are intermediate values which are not the minimum or the maximum. That is, at the fifth position P5, all out of the swing angle of the arm 7, the swing angle of the boom 6, and the swing angle of the bucket 8 are intermediate values which are not the maximum or the minimum.

In step S4, the operator inputs the first working point position information into an input unit 63 of the calibration device 60. The first working point position information indicates the coordinates of the cutting edge of the bucket 8 at the first position P1 to the fifth position P5 which are measured using the external measurement device 62. Accordingly, in step S4, the operator inputs, into the input unit 63 of the calibration 60, the coordinates of the cutting edge of the bucket 8 at the first position P1 to the fifth position P5 which are measured using the external measurement device 62.

Figure 17:
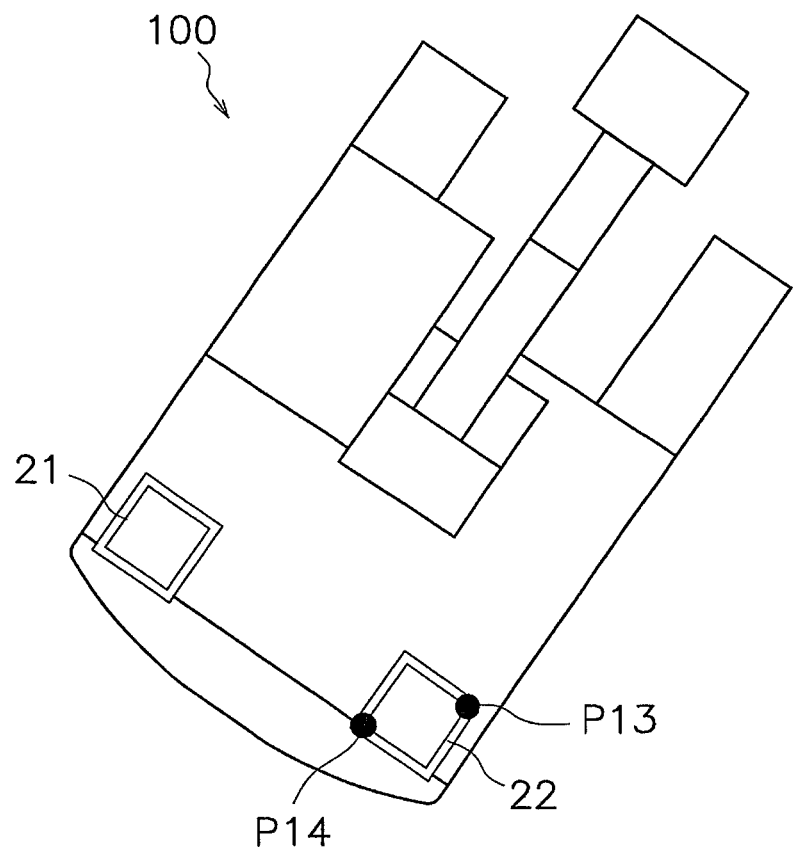
FIG. 17 is a top view illustrating positions of a third measurement point and a fourth measurement point on a direction antenna.

In step S5, the operator measures the positions of the antennas 21 and 22 using the external measurement device 62. Here, as shown in FIG. 16, the operator measures positions of a first measurement point P11 and a second measurement point P12 on the reference antenna 21 using the external measurement device 62. The first measurement point P11 and the second measurement point P12 are arranged to be symmetrical with respect to the center of the upper surface of the reference antenna 21. As shown in FIG. 16, the first measurement point P11 and the second measurement point P12 are two points on a diagonal on the upper surface of the reference antenna 21 if the shape of the upper surface of the reference antenna 21 is a rectangle or a square. In addition, as shown in FIG. 17, the operator measures positions of a third measurement point P13 and a fourth measurement point P14 on the direction antenna 22 using the external measurement device 62. The third measurement point P13 and the fourth measurement point P14 are arranged to be symmetrical with respect to the center of the upper surface of the direction antenna 22. The third measurement point P13 and the fourth measurement point P14 are two points on a diagonal on the upper surface of the direction antenna 22 in the same manner as the first measurement point P11 and the second measurement point P12. Here, it is preferable for marks to be added in the first measurement point P11 to the fourth measurement point P14 in order to facilitate the measurement. For example, bolts or the like included as parts in the antennas 21 and 22 may be used as the marks.

In step S6, the operator inputs antenna position information into the input unit 63 of the calibration unit 60. The antenna position information includes coordinates which indicate the positions of the first measurement point P11 to the fourth measurement point P14 which the operator measures using the external measurement device 62 in step S5.

Figure 18:
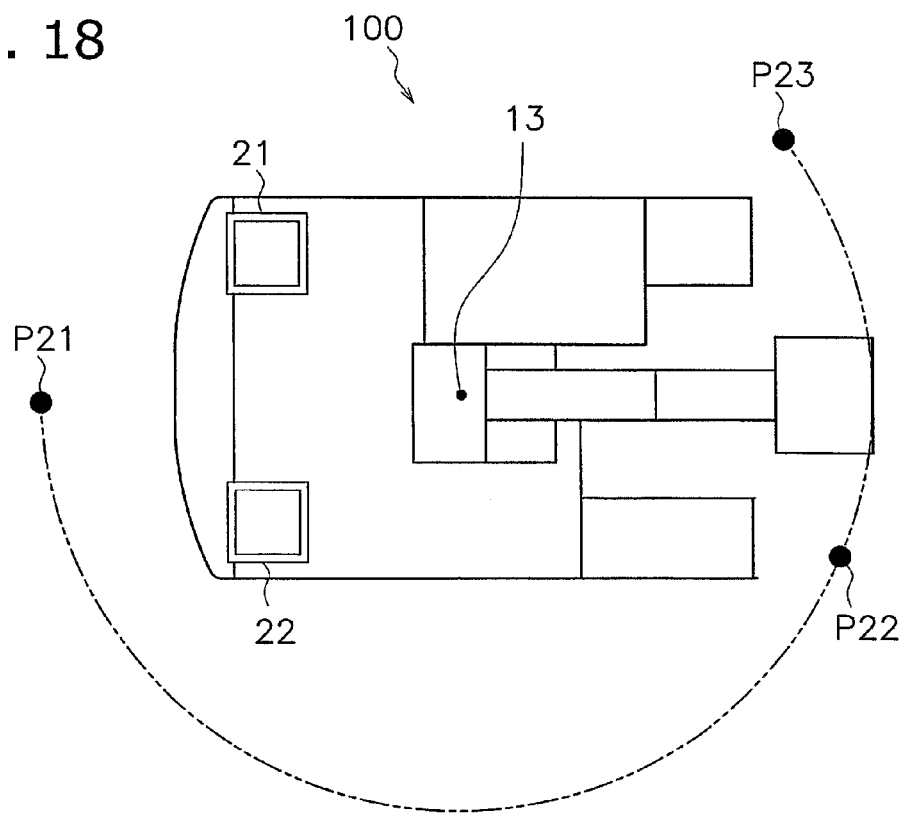
FIG. 18 is a top view illustrating three positions of a cutting edge where rotation angles are different.

In step S7, the operator measures three positions of the cutting edge where the rotation angle is different. Here, as shown in FIG. 18, the operator carries out rotation of the pivoting body 3 by operating the rotation operation member 51. At this time, the posture of the work implement 2 is continuously fixed. Then, the operator measures the three positions of the cutting edge where the rotation angle is different (referred to below as a "first rotation position P21", a "second rotation position P22", and a "third rotation position P23") using the external measurement device 62.

In step S8, the operator inputs the second working position information to the input unit 63 of the calibration unit 60. The second working position information includes coordinates indicating the first rotation position P21, the second rotation position P22, and the third rotation position P23 which the operator measures using the external measurement device 62 in step S7.

In step S9, the operator inputs bucket information to the input unit 63 of the calibration unit 60. The bucket information is information which relates to the dimensions of the bucket 8. The bucket information includes the distance (Lbucket4_x) between the bucket pin 15 and the second link pin 48a in the xbucket axial direction and the distance (Lbucket4_z) between the bucket pin 15 and the second link pin 48a in the zbucket axial direction which are described above. The operator inputs, as the bucket information, design values or values that are measured using a measurement means such as a measuring tape.

In step S10, the operator instructs the calibration device 60 to execute the calibration.

Figure 19:
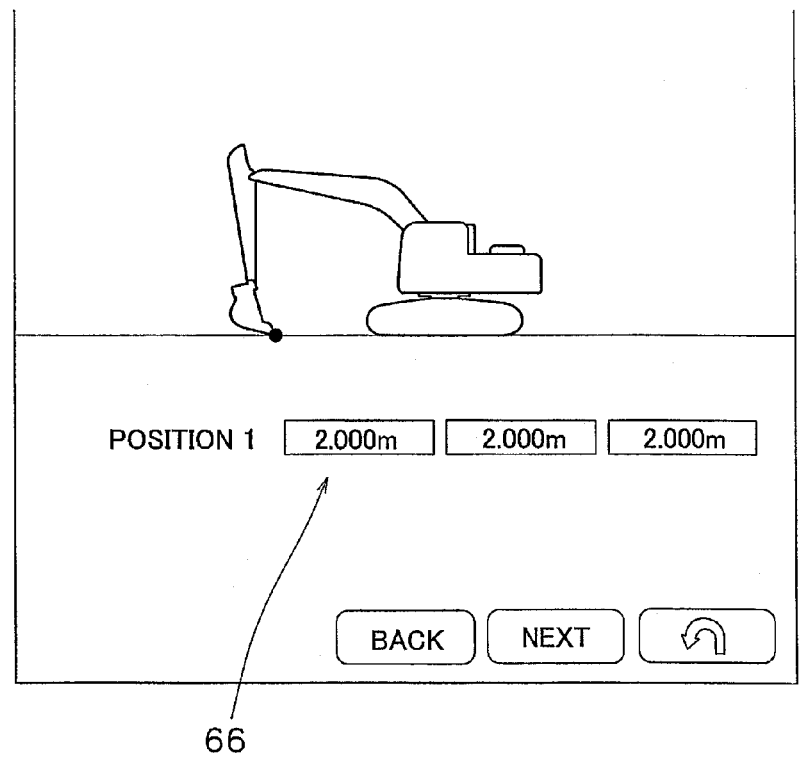
FIG. 19 is a diagram illustrating an example of an operation screen of a calibration device.

Next, a process executed by the calibration device 60 will be described. As shown in FIG. 3, the calibration device 60 has the input unit 63, a display unit 64, and a computation unit 65. The input unit 63 is a unit to which the first working point position information, the second working point position information, the antenna position information, and the bucket information described above are input. The input unit 63 comprises a configuration for the operator to manually input the information described above, and for example, has a plurality of keys. The input unit 63 may be a touch panel as long as it is possible to input numerical values. The display unit 64 is, for example, an LCD and is a unit that displays an operation screen for performing calibration. FIG. 19 illustrates an example of an operation screen of the calibration device 60. An input column 66 for inputting the information described above is displayed in the operation screen. The operator inputs the information described above into the input column 66 of the operation screen by operating the input unit 63.

Figure 20:
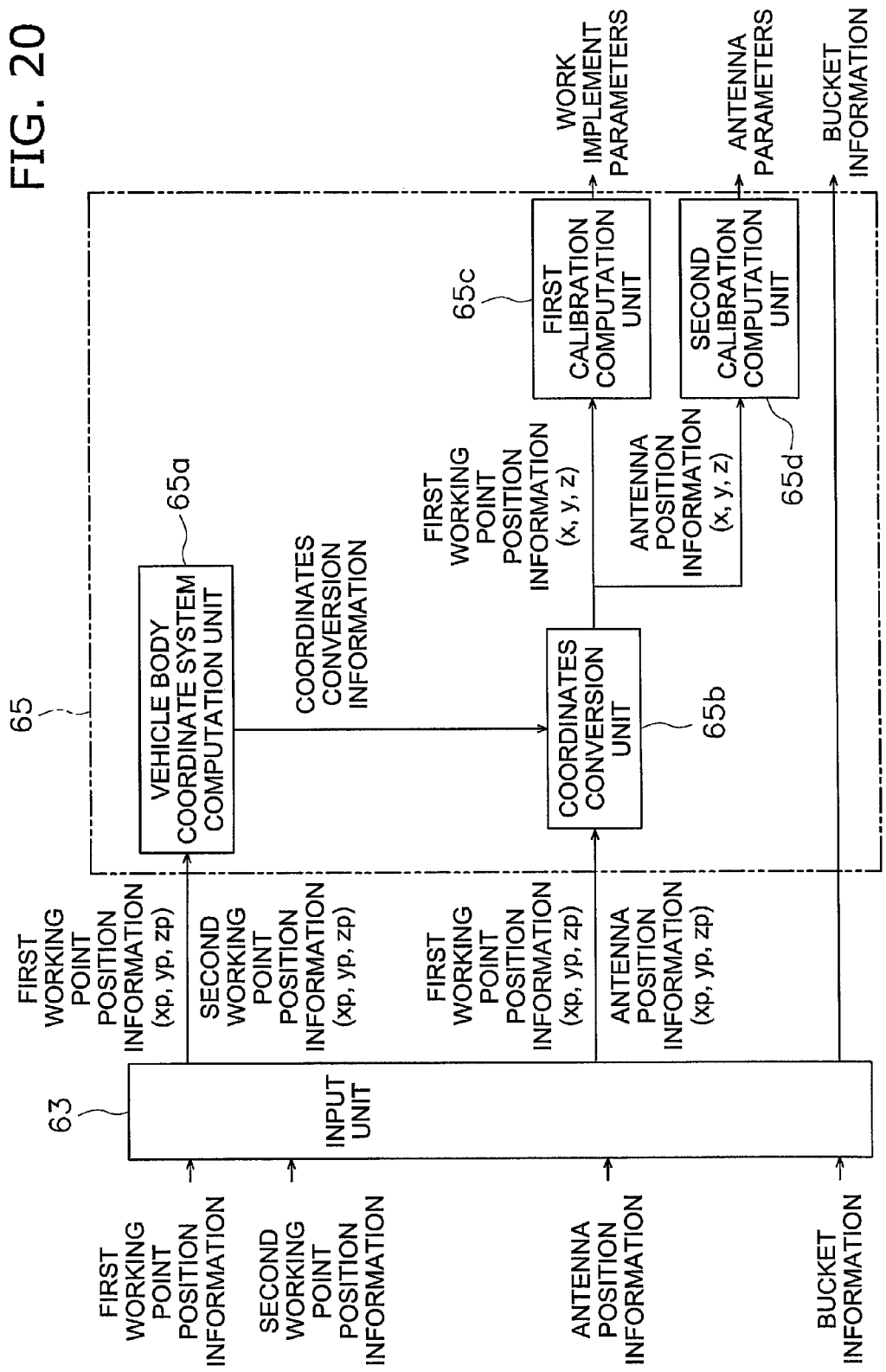
FIG. 20 is a functional block diagram illustrating a processing function related to calibration by the calibration device.

The computation unit 65 executes the process of calibrating the parameters based on the information input via the input unit 63. FIG. 20 is a functional block diagram illustrating a processing function related to calibration by the computation unit 65. The computation unit 65 has each of the functions of a vehicle body coordinate system computation unit 65a, a coordinate conversion unit 65b, a first calibration computation unit 65c, and a second calibration computation unit 65d.

The vehicle body coordinate system computation unit 65a computes the coordinate conversion information based on the first working point position information and the second working point position information which are input using the input unit 63. The coordinate conversion information is information for converting the coordinate system with respect to the external measurement device 62 to the vehicle body coordinate system. The first working point position information and the antenna position information described above are expressed using a coordinate system (xp, yp, zp) with respect to the external measurement device 62 because the first working point position information and the antenna position information are measured using the external measurement device 62. The coordinate conversion information is information for converting the first working point position information and the antenna position information in the coordinates with respect to the external measurement device 62 to those in the vehicle body coordinate system (x, y, z). Below, the method for computing the coordinate conversion information will be described.

Figure 21:
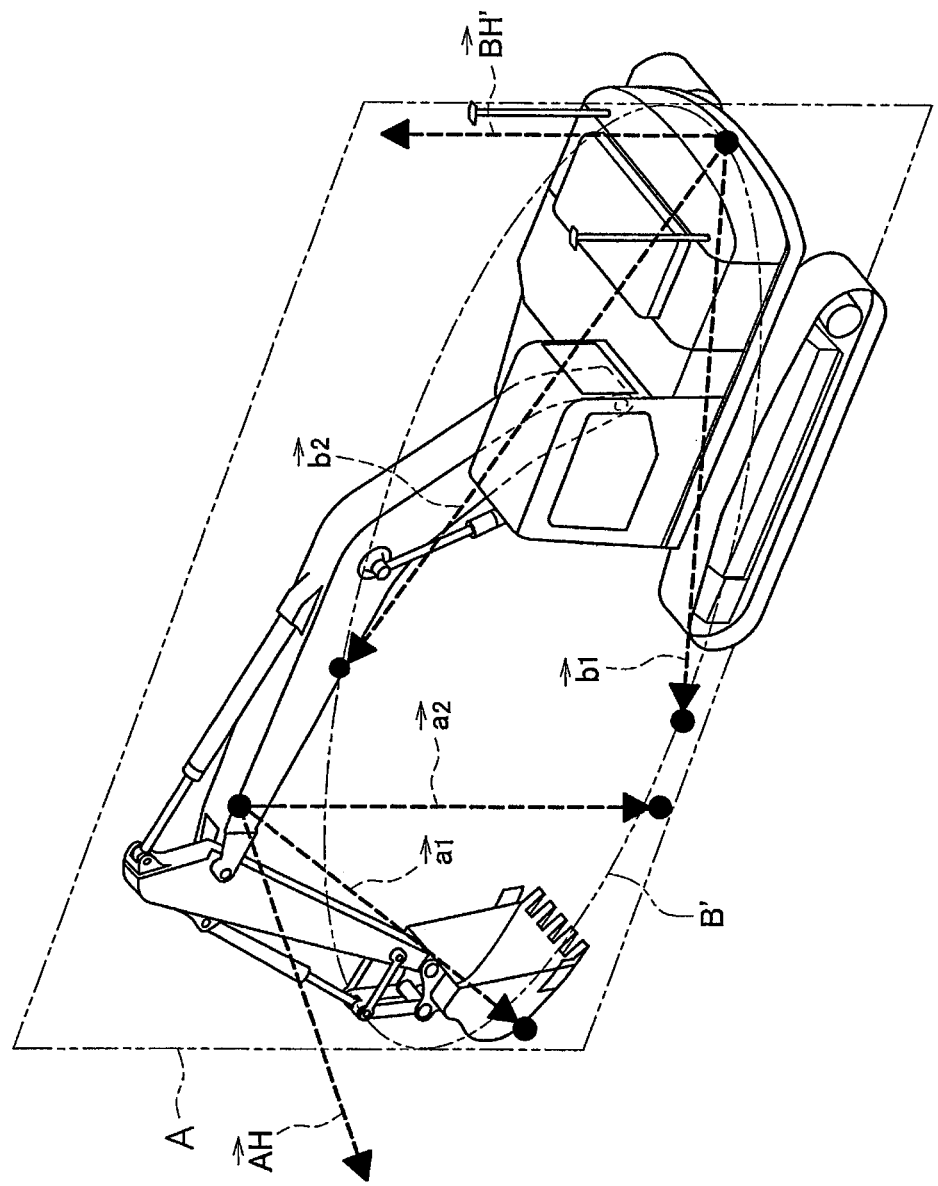
FIG. 21 is a diagram for explaining a computing method of coordinate conversion information.

First, as shown in FIG. 21, the vehicle body coordinate system computation unit 65a computes a first unit normal vector AH perpendicular to an action plane A of the work implement 2 based on the first working point position information. The vehicle body coordinate system computation unit 65a computes the action plane of the work implement 2 using a least square method from the five positions included in the first working point position information and then computes the first unit normal vector AH. Here, the first unit normal vector AH may be computed based on two vectors a1 and a2 which are obtained using the coordinates of three positions that are not as distant as the other two positions out of the five positions included in the first working point position information.

Figure 22:
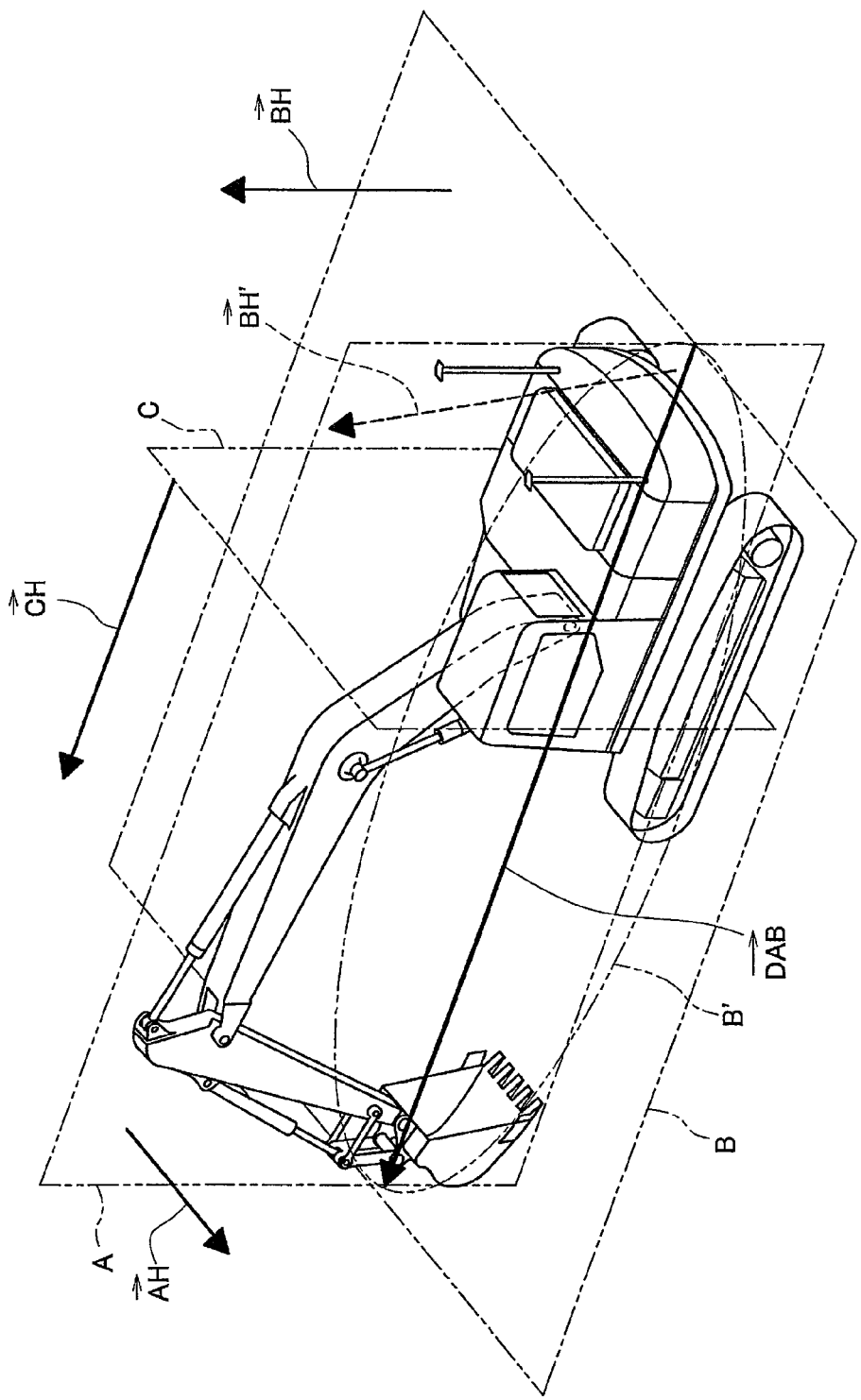
FIG. 22 is a diagram for explaining a computing method of coordinate conversion information.

Next, the vehicle body coordinate system computation unit 65a computes a second unit normal vector perpendicular to a rotation plane B of the pivoting body 3 based on the second working point position information. Specifically, the vehicle body coordinate system computation unit 65a computes a second unit normal vector BH' perpendicular to a rotation plane B' based on two vectors b1 and b2 which are obtained using the coordinates of the first rotation position P21, the second rotation position P22, and the third rotation position P23 included in the second working point position information. Next, as shown in FIG. 22, the vehicle body coordinate system computation unit 65a computes an intersection vector DAB of the rotation plane B' and the action plane A of the work implement 2 described above. The vehicle body coordinate system computation unit 65a computes a unit normal vector of the plane B, which passes through the intersection vector DAB and is perpendicular to the action plane A of the work implement 2, as the second unit normal vector BH which is corrected. Then, the vehicle body coordinate system computation unit 65a computes a third unit normal vector CH which is perpendicular to both the first unit normal vector AH and the second unit normal vector BH which is corrected.

The coordinate conversion unit 65b converts, using the coordinate conversion information, the first working point position information and the antenna position information, which are measured using the external measurement device 62, in the coordinate system (xp, yp, zp) in the external measurement device 62 to those in the vehicle body coordinate system (x, y, z) in the hydraulic shovel 100. The coordinate conversion information includes the first unit normal vector AH, the second unit normal vector BH which is corrected, and the third unit normal vector CH which are described above. Specifically, coordinates in the vehicle body coordinate system are computed using the inner product of vector p whose coordinates are in the coordinate system of the external measurement device 62 and each of the normal vectors AH, BH, and CH in the coordinate conversion information as shown in equation 7 below.

$$x = \vec{p} \cdot \vec{CH}$$

$$y = \vec{p} \cdot \vec{AH}$$

$$z = \vec{p} \cdot \vec{BH} \qquad \text{Equation 7}$$

The first calibration computation unit 65c computes the calibration values of the parameters by using numerical analysis based on the first working point position information that is converted into the vehicle body coordinate system.

Specifically, the calibration values of the parameters are computed using a least squares method as shown in equation 8 below.

Equation 8

$$J = \frac{1}{2}\sum_{k=1}^{n}\{L1\sin(\alpha k) + L2\sin(\alpha k + \beta k) + L3\sin(\alpha k + \beta k + \gamma k) - xk\}^2 +$$
$$\frac{1}{2}\sum_{k=1}^{n}\{L1\cos(\alpha k) + L2\cos(\alpha k + \beta k) + L3\cos(\alpha k + \beta k + \gamma k) - zk\}^2$$

The value of k, which is described above, represents the first position P1 to the fifth position P5 in the first working point position information. Accordingly, n=5. (x1, z1) are coordinates of the first position P1 in the vehicle body coordinate system. (x2, z2) are coordinates of the second position P2 in the vehicle body coordinate system. (x3, z3) are coordinates of the third position P3 in the vehicle body coordinate system. (x4, z4) are coordinates of the fourth position P4 in the vehicle body coordinate system. (x5, z5) are coordinates of the fifth position P5 in the vehicle body coordinate system. The calibration values of the work implement parameters are computed by searching for points where function J in equation 8 is minimized. Specifically, the calibration values of No. 1 to 29 of the work implement parameters are computed using the lists in FIGS. 6A and 6B. Here, out of the work implement parameters included in the lists in FIGS. 6A and 6B, the distance Lbucket4_x between the bucket pin 15 and the second link pin 48a in the xbucket axial direction and the distance Lbucket4_z between the bucket pin 15 and the second link pin 48a in the zbucket axial direction are set to values that are input as the bucket information for computation.

The second calibration computation unit 65d calibrates the antenna parameters based on the antenna position information which is input into the input unit 63. Specifically, the second calibration computation unit 65d computes the coordinates of the midpoint of the first measurement point P11 and the second measurement point P12 as the coordinates of the position of the reference antenna 21. Specifically, the coordinates of the position of the reference antenna 21 are expressed using the distance Lbbx between the boom pin 13 and the reference antenna 21 in the x axial direction of the vehicle body coordinate system, the distance Lbby between the boom pin 13 and the reference antenna 21 in the y axial direction of the vehicle body coordinate system, and the distance Lbbz between the boom pin 13 and the reference antenna 21 in the z axial direction of the vehicle body coordinate system which are described above. In addition, the second calibration computation unit 65d computes the coordinates of the midpoint of the third measurement point P13 and the fourth measurement point P14 as the coordinates of the position of the direction antenna 22. Specifically, the coordinates of the position of the direction antenna 22 are expressed using the distance Lbdx between the boom pin 13 and the direction antenna 22 in the x axial direction of the vehicle body coordinate system, the distance Lbdy between the boom pin 13 and the direction antenna 22 in the y axial direction of the vehicle body coordinate system, and the distance Lbdz between the boom pin 13 and the direction antenna 22 in the z axial direction of the vehicle body coordinate system. Then, the second calibration computation unit 65d outputs the coordinates of the positions of the antennas 21 and 22 as the calibration values of the antenna parameters Lbbx, Lbby, Lbbz, Lbdx, Lbdy, and Lbdz.

The work implement parameters which are computed using the first calibration computation unit 65c, the antenna parameters which are computed using the second calibration computation unit 65d, and the bucket information are stored in the storage unit 43 of the display controller 39 and are used in the computation of the position of the cutting edge described above.

4. Characteristics

The calibration system according to the embodiment has the following characteristics.

The coordinates of the cutting edge of the bucket 8 at a plurality of positions, which are measured by the external measurement device 62, are converted to the vehicle body coordinate system. Then, the calibration values of the parameters are automatically computed by numerical analysis based on the converted coordinates of the cutting edge of the bucket 8 at a plurality of positions in the vehicle body coordinate system. As a result, it is possible to reduce the number of parameters for which actual measurement is necessary. In addition, it is not necessary to perform rearrangement of the values of the parameters until the actual value and the computed value of the position coordinates of the cutting edge of the bucket 8 match during calibration. Hereby, in the calibration system of the hydraulic shovel 100 according to the embodiment, it is possible to improve the accuracy of position detection of the cutting edge and to shorten the calibration work time as well.

As shown in FIG. 21, the unit normal vector BH' perpendicular to the rotation plane B' specified from the second working point position information is not used as the second unit normal vector. At first, the intersection vector DAB of the action plane A of the work implement 2 and the rotation plane B' of the pivoting body 3 as shown FIG. 22 is computed. Then, the unit normal vector BH of the plane B, which passes through the intersection vector DAB and is perpendicular of the action plane A of the work implement 2, is computed as the second unit normal vector. As a result, it is possible to accurately compute the vehicle body coordinate system even in a case where the action plane A of the work implement 2 and the rotation plane B' of the pivoting body 3 are not strictly perpendicular. Hereby, it is possible to further improve the accuracy of position detection of the cutting edge of the bucket 8.

The first working point position information includes coordinates of the first position P1 to the fifth position P5 which are different positions in the upward and downward direction of the work implement 2 and/or which are different positions in the front and back direction of the vehicle body. It is possible to accurately compute the coordinate conversion information since the coordinates of various positions are used in this manner.

5. Other Embodiments

Above, an embodiment of the present invention has been described, but the present invention is not limited to the embodiment described above and various modifications are possible as below within the scope which does not depart from the gist of the invention.

In the embodiment described above, the bucket 8 is given as an example of the work tool, but work tools other than the bucket 8 may be used. In addition, the cutting edge of the bucket 8 is given as an example of the working point, but in a case where a work tool other than the bucket 8 is used, the working point may be a portion which comes into contact with a work target object such as a point which is positioned at the tip end of the work tool.

In the embodiment described above, the swing angles α, β, and γ of the boom 6, the arm 7, and the bucket 8 respectively are computed from the stroke lengths of the cylinders but may be directly detected using an angle sensor.

The first working point position information is not limited to the coordinates at the five positions of the cutting edge of the bucket 8 described above. For example, the first working point position information may include at least three positions of the working point where the posture of the work implement 2 is different. In this case, it is sufficient if the three positions of the working point are not lined up on a single straight line and the position of one of the working points is separated in the upward and downward direction or the front and back direction of the vehicle body with regard to a straight line that links the other two working points. In addition, in relation to the computation of the coordinate conversion information, the first working point position information may include at least two positions of the working point where the posture of the work implement 2 is different and a position of a predetermined reference point on the action plane of the work implement 2 (for example, a midpoint of the boom pin 13 in the vehicle widthwise direction).

In the embodiment described above, the first working point position information, the second working point position information, and the antenna position information are input into the input unit 63 of the calibration device 60 due to manual input by the operator, but may be input into the input unit 63 of the calibration device 60 from the external measurement device 62 using a wired or wireless communication means.

The external measurement device 62 is not limited to a total station and may be another device which measures the position of the working point.

In the embodiment described above, the unit normal vector BH, where the unit normal vector BH' that is perpendicular to the rotation plane B' specified from the second working point position information is corrected, is used as the coordinate conversion information, but the unit normal vector BH' may be used as the coordinate conversion information.

According to the illustrated embodiments, it is possible to provide a calibration system and a calibration method for a hydraulic shovel that can improve the accuracy of position detection of a working point and shorten calibration work time.

The invention claimed is:

1. A hydraulic shovel calibration device comprising:
a hydraulic shovel including
a travel unit,
a pivoting body rotatably attached to the travel unit,
a work implement including a boom swingably attached to the pivoting body, an arm swingably attached to the boom, and a work tool swingably attached to the arm,
an angle detection unit configured to detect a swing angle of the boom with respect to the pivoting body, a swing angle of the arm with respect to the boom, and a swing angle of the work tool with respect to the arm, and
a current position computation unit configured to compute a current position of a working point included in the work tool based on a plurality of parameters that indicate the swing angles and dimensions of the boom, the arm, and the work tool;
a calibration device configured and arranged to calibrate the parameters; and
an external measurement device configured and arranged to measure a position of the working point,
wherein the calibration device includes
an input unit configured and arranged to input first working point position information and second working point position information, wherein the first working point position information includes either at least two positions of the working point where a posture of the work implement is different and a position of a predetermined reference point on an action plane of the work implement, the at least two positions and the position of the predetermined reference point being measured by the external measurement device, or at least three positions of the working point where the posture of the work implement is different, the at least three positions being measured by the external measurement device, and the second working point position information includes at least three positions of the working point where a rotation angle of the pivoting body with respect to the travel unit is different,
a vehicle body coordinate system computation unit configured to compute a first unit normal vector perpendicular to the action plane of the work implement based on the first working point position information, a second unit normal vector perpendicular to a rotation plane of the pivoting body based on the second working point position information, and a third unit normal vector perpendicular to the first unit normal vector and the second unit normal vector,
a coordinate conversion unit configured to convert coordinates at a plurality of positions of the working point measured by the external measurement device in a coordinate system of the external measurement device to those in a vehicle body coordinate system of the hydraulic shovel using the first unit normal vector, the second unit normal vector, and the third unit normal vector, and
a calibration computation unit configured to compute calibration values of the parameters based on the coordinates converted by the coordinate conversion unit at the plurality of positions of the working point in the vehicle body coordinate system.

2. The hydraulic shovel calibration system according to claim 1, wherein
the vehicle body coordinate system computation unit is configured to compute an intersection vector of the action plane of the work implement and a rotation plane of the pivoting body and to compute, as the second unit normal vector, a unit normal vector of a plane which passes through the intersection vector of the action plane of the work implement and the rotation plane and which is perpendicular to the action plane of the work implement.

3. The hydraulic shovel calibration system according to claim 1, wherein
the first working point position information includes coordinates of a plurality of positions which are different positions in an upward and downward direction of the work implement and/or which are different positions in a front and back direction of the vehicle body.

4. The hydraulic shovel calibration system according to claim 1, wherein
the parameters include a first distance between a swing pivot of the boom with respect to the pivoting body and a swing pivot of the arm with respect to the boom, a second distance between the swing pivot of the arm with respect to the boom and a swing pivot of the work tool with respect to the arm, and a third distance between the swing pivot of the work tool with respect to the arm and the working point, the current position computation unit is configured to compute the current position of the working point in the vehicle body coordinate system based on the first distance, the second distance, the third distance, and the swing angles, and the calibration computation unit is configured to compute the calibration values of the first distance, the second distance, and the third distance based on coordinates at a plurality of positions of the working point which are measured by the external measurement device and converted into the vehicle body coordinate system.

5. The hydraulic shovel calibration system according to claim 1, wherein
the external measurement device is a total station.

6. A hydraulic shovel calibration method for calibrating parameters in a hydraulic shovel, the hydraulic shovel including
a travel unit,
a pivoting body rotatably attached to the travel unit,
a work implement including a boom swingably attached to the pivoting body, an arm swingably attached to the boom, and a work tool swingably attached to the arm,
an angle detection unit configured to detect a swing angle of the boom with respect to the pivoting body, a swing angle of the arm with respect to the boom, and a swing angle of the work tool with respect to the arm, and
a current position computation unit configured to compute a current position of a working point included in the work tool based on a plurality of parameters that indicate the dimensions and the swing angles of the boom, the arm, and the work tool;

the hydraulic shovel calibration method comprising:
measuring a position of the working point using an external measurement device;

inputting first working point position information and second working point position information into a calibration device for calibrating the parameters, wherein the first working point position information includes either at least two positions of the working point where a posture of the work implement is different and a position of a predetermined reference point on an action plane of the work implement, the at least two positions and the position of the predetermined reference point being measured by the external measurement device or at least three positions of the working point where the posture of the work implement is different, the at least three positions being measured by the external measurement device, and the second working point position information includes at least three positions of the working point where a rotation angle of the pivoting body with respect to the travel unit is different;

computing a first unit normal vector perpendicular to the action plane of the work implement based on the first working point position information, a second unit normal vector perpendicular to a rotation plane of the pivoting body based on the second working point position information, and a third unit normal vector perpendicular to the first unit normal vector and the second unit normal vector, using the calibration device;

converting coordinates at a plurality of positions of the working point measured by the external measurement device in a coordinate system of the external measurement device to those in a vehicle body coordinate system of the hydraulic shovel using the first unit normal vector, the second unit normal vector, and the third unit normal vector, using the calibration device; and computing calibration values of the parameters based on the converted coordinates at the plurality of positions of the working point in the vehicle body coordinate system, using the calibration device.

* * * * *